(12) United States Patent
Choi et al.

(10) Patent No.: US 10,182,439 B2
(45) Date of Patent: Jan. 15, 2019

(54) METHOD AND APPARATUS FOR DATA-AIDED ITERATIVE CHANNEL ESTIMATION

(71) Applicants: Yoo Jin Choi, San Diego, CA (US); Dongwoon Bai, San Diego, CA (US); Sungsoo Kim, Seoul (KR); Jungwon Lee, San Diego, CA (US)

(72) Inventors: Yoo Jin Choi, San Diego, CA (US); Dongwoon Bai, San Diego, CA (US); Sungsoo Kim, Seoul (KR); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/131,781

(22) Filed: Apr. 18, 2016

(65) Prior Publication Data

US 2017/0238317 A1 Aug. 17, 2017

Related U.S. Application Data

(60) Provisional application No. 62/295,737, filed on Feb. 16, 2016.

(51) Int. Cl.
*H04W 72/04* (2009.01)
*H04B 1/10* (2006.01)
(Continued)

(52) U.S. Cl.
CPC .......... *H04W 72/0453* (2013.01); *H04B 1/10* (2013.01); *H04J 4/00* (2013.01);
(Continued)

(58) Field of Classification Search
CPC ............. H03M 13/41; H03M 13/4115; H03M 13/413; H03M 13/4138; H03M 13/45;
(Continued)

(56) References Cited

U.S. PATENT DOCUMENTS

| 6,377,607 B1 * | 4/2002 | Ling ................. H03M 13/2957 375/130 |
| 6,459,728 B1 | 10/2002 | Bar-David et al. |

(Continued)

FOREIGN PATENT DOCUMENTS

| EP | 2757750 | 1/2013 |
| EP | 2597833 | 5/2013 |

(Continued)

OTHER PUBLICATIONS

E. Ustunel, Expectation-Maximization (EM) based channel estimation and interpolation in OFDM systems, IEEE, 2012.

(Continued)

*Primary Examiner* — Young T Tse
(74) *Attorney, Agent, or Firm* — The Farrell Law Firm, P.C.

(57) ABSTRACT

An apparatus and a method. The apparatus includes a channel estimation (CE) module, including a first input for receiving pilot resource element (RE) observations, a second input for receiving data RE observations, a third input for receiving log-likelihood ratios (LLRs), and an output; a detector, including a first input connected to the output of the CE module, a second input for receiving data RE observations, and an output connected to the third input of the CE module; and a decoder, including an input connected to the third input of the CE module, and an output.

9 Claims, 9 Drawing Sheets

(51) Int. Cl.
*H04L 5/00* (2006.01)
*H04L 25/02* (2006.01)
*H04L 27/20* (2006.01)
*H04J 4/00* (2006.01)
*H04L 1/18* (2006.01)

(52) U.S. Cl.
CPC ............ *H04L 1/1819* (2013.01); *H04L 5/005* (2013.01); *H04L 5/0073* (2013.01); *H04L 25/0256* (2013.01); *H04L 27/2017* (2013.01)

(58) Field of Classification Search
CPC ..... H04B 1/10; H04B 1/16; H04J 4/00; H04L 1/0054; H04L 1/1819; H04L 5/0048; H04L 5/005; H04L 5/0073; H04L 25/0202; H04L 25/025; H04L 25/0256; H04L 2025/03636; H04L 27/2017; H04W 72/0453
USPC ................ 375/259–262, 265, 267, 340, 341; 714/794, 795
See application file for complete search history.

(56) References Cited

U.S. PATENT DOCUMENTS

| | | |
|---|---|---|
| 7,139,321 B2 | 11/2006 | Giannakis et al. |
| 7,352,829 B2 | 4/2008 | Jalloul et al. |
| 7,421,041 B2 | 9/2008 | Khandekar et al. |
| 7,656,958 B2 | 2/2010 | Lo et al. |
| 7,660,568 B2 | 2/2010 | Sharma et al. |
| 8,005,156 B2 | 8/2011 | Hojen-Sorensen et al. |
| 8,094,762 B2 | 1/2012 | Krasny et al. |
| 8,416,889 B2 | 4/2013 | Dell'Amico et al. |
| 8,462,613 B2 | 6/2013 | Zhang et al. |
| 8,554,151 B2 | 10/2013 | Cho et al. |
| 8,699,553 B2 | 4/2014 | Rosenqvist et al. |
| 8,761,322 B2 | 6/2014 | Jain et al. |
| 2004/0174939 A1* | 9/2004 | Wang ............... H04L 1/005 375/316 |
| 2005/0176436 A1* | 8/2005 | Mantravadi ......... H04L 25/022 455/450 |
| 2006/0133529 A1 | 6/2006 | Lee et al. |
| 2006/0133533 A1* | 6/2006 | Khandekar ......... H04L 1/0025 375/279 |
| 2007/0283220 A1* | 12/2007 | Kim ................. H03M 13/1148 714/758 |
| 2009/0254797 A1* | 10/2009 | Wu .................. H03M 13/3746 714/794 |
| 2011/0069746 A1* | 3/2011 | Chockalingam ..... H04B 7/0669 375/224 |
| 2013/0064313 A1 | 3/2013 | Gatti et al. |
| 2014/0348120 A1 | 11/2014 | Kant et al. |
| 2015/0098420 A1 | 4/2015 | Luo et al. |
| 2015/0215010 A1* | 7/2015 | Shim ................. H04B 7/0413 375/341 |
| 2015/0333934 A1 | 11/2015 | Wan et al. |

FOREIGN PATENT DOCUMENTS

| | | |
|---|---|---|
| WO | WO 2012/092642 | 7/2012 |
| WO | WO 2014/117849 | 8/2014 |
| WO | WO 2014/180510 | 11/2014 |

OTHER PUBLICATIONS

Ming Zhao et al., Iterative Turbo Channel Estimation for OFDM System over Rapid Dispersive Fading Channel, Wireless Communications, IEEE Transactions, Aug. 2008 (vol. 7, Issue: 8).
J. Baltersee, et al., Achievable rate of MIMO channels with data aided channel estimation and perfect interleaving, Selected Areas in Communications, IEEE Journal, Dec. 2001 (vol. 19, Issue: 12).
J. Gao et al., Decision-directed estimation of MIMO time-varying Rayleigh fading channels, IEEE Trans. Wireless Communication, 4(4), 2005.
C. Georghiades et al., Sequence estimation in the presence of random parameters via the EM algorithm, IEEE Trans. Commun., 45(3), 1997.
H. Zamiri-Jafarian, et al., EM-based recursive estimation of channel parameters, IEEE Trans. Communication, 1999, 47(9).
C. H. Aldana et al., Channel estimation for mufticarrier multiple input single output systems using the EM algorithm, IEEE Trans. Signal Process., 2003, 51(12).
J. Ylionias, et al., Iterative joint detection, decoding, and channel estimation in Turbo-Coded MIMO-OFDM, IEEE Trans. Veh. Technol., 2009.
M.P. Portugal, et al., Improved OFDM receiver with iterative channel estimation and turbo decoding, EUSIPCO, 2005.
C. Cozzo et al., Joint Channel Estimation and data detection in space-time communications, IEEE Trans. Commun., 2003, 51(8).
S. Song, et al, Soft input channel estimation for turbo equalization, IEEE Trans. Signal Process., 2004, 52(10).
D. Yoon, et al., Soft-decision-driven channel estimation for pipelined turbo receivers, IEEE Trans. Commun., 2011, 59(8).
Y. Liu, et al., Iterative compensated MMSE channel estimation in LTE systems, ICC, 2012.
S. Park, et al., Iterative Channel Estimation using Virtual Pilot Signals for MIMO-OFDM Systems, IEEE Trans. Signal Process., 2015, 63(12).
Martin Hirschbeck, et al., Low Complexity Iterative Channel Estimation for the L-band Digital Aeronautical Communication System 1 based on OFDM 18th International OFDM Workshop 2014 (InOWo'14); Proceedings of Date of Conference: Aug. 27-28, 2014.
A. Movahedian, On the Capacity of Iteratively Estimated Channels Using LMMSE Estimators, Vehicular Technology, IEEE Transactions on (vol. 64, Issue: 1), 2015.

* cited by examiner

METHOD AND APPARATUS FOR DATA-AIDED ITERATIVE CHANNEL ESTIMATION

PRIORITY

This application claims priority under 35 U.S.C. § 119(e) to a U.S. Provisional Patent Application filed on Feb. 16, 2016 in the United States Patent and Trademark Office and assigned Ser. No. 62/295,737, the entire contents of which are incorporated herein by reference.

FIELD

The present disclosure relates generally to a method of and an apparatus for data-aided iterative channel estimation (CE), and more particularly, to a method of and an apparatus for data-aided iterative CE using feedback from a detector or a decoder.

BACKGROUND

Channel estimation is one of the key elements necessary for reliable communication in wireless systems. Many wireless communication systems provide pilot signals for assisting CE. Pilot-aided CE is preferable due to its simplicity, but it has a limitation that comes from the fact that inserting a pilot signal in a data transmission reduces bandwidth efficiency, while the CE quality is bounded by the density of the pilot signal.

SUMMARY

According to one embodiment, an apparatus includes a CE module, including a first input for receiving pilot resource element (RE) observations, a second input for receiving data RE observations, a third input for receiving log-likelihood ratios (LLRs), and an output; a detector, including a first input connected to the output of the CE module, a second input for receiving data RE observations, and an output connected to the third input of the CE module; and a decoder, including an input connected to the third input of the CE module, and an output.

According to one embodiment, an apparatus includes a CE module, including a first input for receiving pilot RE observations, a second input for receiving data RE observations, a third input for receiving LLRs, and an output; a detector, including a first input connected to the output of the CE module, a second input for receiving data RE observations, and an output; and a decoder, including an input connected to the third input of the CE module, and an output connected to the third input of the CE module.

According to one embodiment, a method includes (a) determining a channel estimate using a pilot signal, wherein a counter n is initialized to 0; (b) determining a log likelihood ratio (LLR) of data symbols by a detector based on the channel estimate for one or more layers L; (c) performing decoding of the LLR of the data symbols if n is equal to a predetermined number of iterations, otherwise proceeding to step (d); (d) determining the channel estimate using the LLR of the data symbols from step (c) and data resource element (RE) observations; (e) determining the LLR of the data symbols by the detector based on the channel estimate from step (d); and (f) incrementing n by 1 and returning to step (c).

According to one embodiment, a method includes (a) determining a channel estimate using a pilot signal, where a counter n is initialized to 0; (b) determining a first log likelihood ratio (LLR) of data symbols by a detector based on the channel estimate for one or more layers L; (c) determining a second LLR of the data symbols by a decoder based on the first LLR; (d) determining the channel estimate using the second LLR of the data symbols from step (c) and data resource (RE) observations; (e) determining the first LLR by the detector based on the channel estimate from step (d); (f) determining the second LLR by the decoder based on the first LLR from step (e); (g) incrementing n by 1; and (h) returning to step (d) based on one of not passing a cyclic redundancy check (CRC) and n less than a predetermined number of iterations N.

According to one embodiment, an apparatus includes a pilot-aided minimum mean square error (MMSE) CE module, including a first input for receiving pilot RE observations, a first output, and a second output; a detector, including a first input connected to the first output of the pilot-aided MMSE CE module, a second input for receiving data-aided iterative CE, a third input for receiving iterative detection and decoding (IDD), a first output, and a second output; a decoder, including an input connected to the first output of the detector, a first output connected to the third input of the detector, and a second output; a data-aided iterative CE module, including a first input, a second input connected to the second output of the pilot-aided MMSE CE module, a third input, and an output connected to the second input of the detector; and a symbol regenerator unit, including an input connected to the second output of the detector, and an output connected to the third input of the data-aided iterative CE module.

According to one embodiment, an apparatus includes a pilot-aided MMSE CE module, including a first input for receiving pilot RE observations, a first output, and a second output; a detector, including a first input connected to the first output of the pilot-aided MMSE CE module, a second input for receiving data-aided iterative CE, a third input for receiving IDD, and an output; a decoder, including an input connected to the output of the detector, a first output connected to the third input of the detector, and a second output; a data-aided iterative CE module, including a first input, a second input connected to the second output of the pilot-aided MMSE CE module, a third input, and an output connected to the second input of the detector; and a symbol regenerator unit, including an input connected to the second output of the decoder, and an output connected to the third input of the data-aided iterative CE module.

According to one embodiment, a method includes (a) performing pilot-aided FD MMSE CE for OFDM symbols with pilot signals, wherein a counter n is initialized to 0; (b) performing TD interpolation; (c) performing detection and decoding; (d) if a CRC passes or if n is equal to a predetermined number of iterations N then terminating the method, otherwise proceeding to step (e); (e) performing data-aided FD CE for OFDM symbols with pilot signals; (f) performing TD interpolation; (g) performing detection and decoding; and (h) incrementing n by 1 and returning to step (d).

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
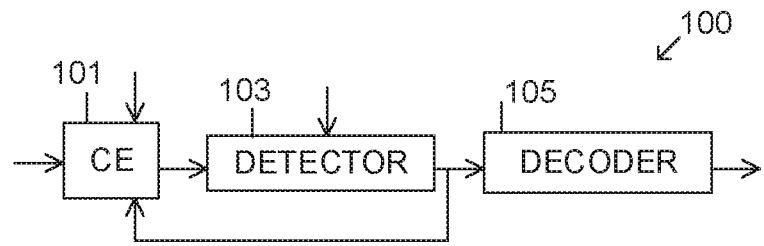
FIG. 1 is a block diagram of an apparatus for data-aided iterative channel estimation (CE) with feedback from a detector, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

According to an embodiment of the present disclosure, CE performance is improved by considering data signals. CE utilizing data signals (e.g., feedback information of data symbols from a detector or a decoder in the form of log-likelihood ratios (LLR)) may be referred to as data-aided CE or decision-directed CE.

The present disclosure concerns (1) a data-aided iterative CE method and apparatus; (2) complexity reduction methods for a data-aided CE method and apparatus; and (3) data RE selection methods for data-aided iterative CE.

The present disclosure also concerns a data-aided iterative channel CE method and apparatus based on feedback information of data symbols from a detector or a decoder in the form of an LLR. According to an embodiment of the present disclosure, an iterative CE method and apparatus may be based on MMSE. MMSE may be extended to an iterative form (iterative MMSE) for exploiting detector or decoder feedback. Three filtering methods may be used for CE of single-layer and multi-layer signals: iterative MMSE; iterative MMSE-soft decision; and iterative MMSE-hard decision. It is noted that MMSE-soft decision and MMSE-hard decision are derivatives of MMSE having low complexity.

In an embodiment of the present disclosure, an iterative CE method and apparatus may be based on maximum a posteriori (MAP).

According to an embodiment of the present disclosure, it may be assumed that AWGN is present, which is beneficial for low signal-to-noise ratio (SNR) and/or a slow-fading channel since it is of low complexity and a large number of observations may be utilized for performance improvement. AWGN may be assumed based on a modulation and coding scheme (MCS)/SNR/channel profile. For multi-layer signals, a single-layer method may be used after soft decision or hard decision cancellation of interfering layers to reduce complexity.

In an embodiment of the present disclosure, channel values are estimated/refined by using detector or decoder feedback for fading channels for both single-layer and multi-layer signals. Channel values may be estimated/refined by using detector or decoder feedback under an AWGN assumption for both single-layer and multi-layer signals. A method or apparatus may assume AWGN depending on an MCS/SNR/channel profile. A single-layer method and apparatus may be used after soft decision or hard decision cancellation of interfering layers for a multi-layer signal.

According to an embodiment of the present disclosure, data-aided iterative CE based on feedback information from a detector or a decoder for data is provided. An initial CE based on a pilot-aided method is provided. Then, detection and decoding is performed. Feedback from either the detector or the decoder may be used. The output of either the detector or the decoder of data is fed back and used for data-aided CE in order to improve the CE quality. Using a refined CE output, another round of detection and decoding is performed. The steps described above are iterated to improve the final decoder performance. Utilizing a decoder output for iterative CE is beneficial since coding gain may be exploited. The present disclosure improves CE performance of a modem, including but not limited to, 3rd Generation Partnership Project (3GPP), $3^{rd}$ generation (3G)/$4^{th}$ generation (4G) cellular, and wireless fidelity (Wi-Fi) modems.

For pilot signals, a one-way procedure in the order of pilot-aided CE, detection, and decoding may be used for demodulation.

IDD improves detector and decoder performance by adding a feedback loop between the detector and the decoder. It is observed that the cross-layer feedback provides a significant gain for detection and decoding of multi-layer signals.

For pilot-aided CE, a signal may have L layers. For l=1, 2, ..., L, $p^l$ may be a column vector of channels for pilot signals of layer 1, and $y_p^l$ may be an observation of the channels for pilot signals of layer l. Assuming that pilot signals for different layers are orthogonal, $y_p^l$ may be represented as in Equations (1) and (2) as follows:

$$y_p^l = p^l + w^l, \quad (1)$$

for l=1, 2, ..., L, i.e., $$\underbrace{\begin{bmatrix} y_p^1 \\ \vdots \\ y_p^L \end{bmatrix}}_{y_p} = \underbrace{\begin{bmatrix} p^1 \\ \vdots \\ p^L \end{bmatrix}}_{p} + \underbrace{\begin{bmatrix} w^1 \\ \vdots \\ w^L \end{bmatrix}}_{w}, \quad (2)$$

where w is a column vector of background noise, which is independent of the pilot channels p and of zero mean and covariance $R_{ww}$. Even though white noise is considered in the present disclosure, the present disclosure is not limited thereto, and other forms of noise may be considered.

If $h^l$ are the channels of interest, a pilot-aided MMSE solution for an estimate of $h^l$ is given by Equation (3) as follows:

$$\hat{h}_{pilot-aided}^l = R_{h^l p}(R_{pp} + \sigma^2 R_{ww})^{-1} y_p, \quad (3)$$

where $R_{h^l p}$ is a correlation matrix between $h^l$ and p, and $R_{pp}$ is an auto-correlation matrix of p.

If channel correlation across layers is not utilized or there is no channel correlation across layers, Equation (3) above reduces to a per-layer estimation in Equation (4) as follows:

$$\hat{h}_{pilot-added}^l = R_{h^l p^l}(R_{p^l p^l} + R_{w^l w^l})^{-1} y_p^l, \quad (4)$$

for l=1, 2, ..., L, where $R_{h^l p^l}$ i is a correlation matrix between $h^l$ and $p^l$, $R_{p^l p^l}$ is an auto-correlation matrix of $p^l$, and $R_{w^l w^l}$ is an auto-correlation matrix of $w^l$.

Detector or decoder a posteriori LLRs are used to obtain a posteriori probabilities (APPs) of data symbols in an iterative step of CE. For an observation y and a CE $\hat{h}$ used for detection, an a posteriori LLR for an n-th bit of data symbol x is defined in Equation (5) as follows:

$$L_n(x) = \log \frac{P(b_n(x) = 1 \mid \hat{h}, y)}{P(b_n(x) = 0 \mid \hat{h}, y)} = \log \frac{(b_n(x) = 1 \mid \hat{h}, y)}{1 - P(b_n(x) = 1 \mid \hat{h}, y)}, \quad (5)$$

where $b_n(x)$ is the n-th bit value of symbol x. The APP of the bit $b_n(x)$ may be represented by Equation (6) as follows:

$$P(b_n(x) = 1 \mid \hat{h}, y) = \frac{e^{\frac{L_n(x)}{2}}}{e^{\frac{L_n(e)}{2}} + e^{-\frac{L_n(x)}{2}}}, \quad (6)$$

$$P(b_n(x) = 0 \mid \hat{h}, y) = \frac{e^{-L_n(x)/2}}{e^{L_n(x)/2} + e^{-L_n(x)/2}},$$

and the APP of symbol x is as in Equation (7) as follows:

$$P(x = s \mid \hat{h}, y) = \prod_{n=1}^{N} P(b_n(x) = b_n(s) \mid \hat{h}, y) \quad (7)$$

$$= \prod_{n=1}^{N} \left( \frac{e^{(2b_n(s)-1)L_n(x)/2}}{e^{L_n(x)/2} + e^{-L_n(x)/2}} \right),$$

where N is a number of bits in a symbol. Using the APP, an expected value and a second order moment of a symbol may be obtained as in Equations (8) and (9) as follows:

$$\mathbb{E}[x \mid \hat{h}, y] = \sum_{i=0}^{2^N - 1} s_i P(x = s_i \mid \hat{h}, y) \quad (8)$$

$$= \sum_{i=0}^{2^N - 1} s_i \prod_{n=1}^{N} P(b_n(x) = b_n(s) \mid \hat{h}, y)$$

$$\mathbb{E}[|x|^2 \hat{h}, y] = \sum_{i=0}^{2^N-1} |s_i|^2 P(x = s_i | \hat{h}, y) \quad (9)$$

$$= \sum_{i=0}^{2^N-1} |s_i|^2 \prod_{n=1}^{N} P(b_n(x) = b_n(s) | \hat{h}, y).$$

For data-aided CE for multi-layer signals, $X_d^l$ may be a diagonal matrix consisting of data symbols of layer l that is used in CE, and $y_d$ may be a vector of an observation for the data symbols. If $d^l$ is a vector of corresponding channels for $X_d^l$ as in Equation (11) as follows:

$$y_d = \sum_{l=1}^{L} X_d^l d^l + z_d = \underbrace{[X_d^1 \ldots X_d^L]}_{X_d} \underbrace{\begin{bmatrix} d^1 \\ \vdots \\ d^L \end{bmatrix}}_{d} + z, \quad (10)$$

where z denotes background noise.

Combining Equations (2) and (10) above results in Equation (11) as follows:

$$y = \begin{bmatrix} y_p \\ y_d \end{bmatrix} = \underbrace{\begin{bmatrix} I_p & 0 \\ 0 & X_d \end{bmatrix}}_{X} \underbrace{\begin{bmatrix} p \\ d \end{bmatrix}}_{g} + \underbrace{\begin{bmatrix} w \\ z \end{bmatrix}}_{n} = Xg + n. \quad (11)$$

An MMSE estimate for $h^l$ using y is then given by Equation (12) as follows:

$$\hat{h}^l = \mathbb{E}_{h^l|y}[h^l] \quad (12)$$

$$= \mathbb{E}_{X|y}[\mathbb{E}_{h^l|X,y}[h^l]]$$

$$= \mathbb{E}_{X|y}[R_{h^l g} X^* (X R_{gg} X^* + R_{nn})^{-1}] y.$$

where $R_{h^l g}$ is a correlation matrix between $h^l$ and g, $R_{gg}$ is an auto-correlation matrix of g, and $R_{nn}$ is an auto-correlation matrix of n.

For an MMSE estimation in Equation (12) above, the distribution of X given y, i.e., P(X|y), is difficult to compute for an unknown random g. However, for iterative MMSE, it may be approximated as in Equation (13) as follows:

$$(\hat{h}^l)^{(i+1)} = \mathbb{E}_{X|\hat{g}^{(i)},y}[R_{h^l g} X^* (X R_{gg} X^* + R_{nn})^{-1}] y \quad (13)$$

$$= \mathbb{E}_{X|\hat{g}^{(i)},y}[R_{h^l g} (X^* R_{nn}^{-1} X R_{gg} + I)^{-1} X^* R_{nn}^{-1}] y,$$

where $\hat{g}^{(0)} = \hat{g}_{pilot-aided}$. The detector or decoder LLR feedback provides the distribution of X given y and some channel estimate $\hat{g}^{(i)}$ of the initial or previous iteration, i.e., $P(X|\hat{g}^{(i)}, y)$.

To compute an iterative MMSE, MMSE filtering is performed for each candidate of X to take an expectation. To reduce complexity, an expectation may be taken first and then an MMSE filter may be performed as in Equation (14) as follows:

$$(\hat{h}^l)^{(i+1)} = R_{h^l g} (\mathbb{E}_{X|\hat{g}^{(i)},y}[X^* R_{nn}^{-1} X] R_{gg} + I)^{-1} \mathbb{E}_{X|\hat{g}^{(i)},y} [X^*] R_{nn}^{-1} y. \quad (14)$$

The filtering matrix may be computed by using first and second moments of X and channel correlation matrices.

For iterative MMSE-hard, a hard decision output for X may be used instead of taking an expectation, as in Equation (15) as follows:

$$(\hat{h}^l)^{(i+1)} = R_{h^l g} ((\hat{X}^{(i)})^* R_{nn}^{-1} \hat{X}^{(i)} R_{gg} + I)^{-1} (\hat{X}^{(i)})^* R_{nn}^{-1} y, \text{ where} \quad (15)$$

$$\hat{X}^{(i)} = \underset{S}{\text{argmax}} P(X = S | \hat{g}^{(i)}, y).$$

A single-layer iterative MMSE method may be employed after soft decision or hard decision cancellation of interfering layers for multi-layer signals. Equations (16)-(18) are defined as follows:

$$X^l = \begin{bmatrix} I_p^l & 0 \\ 0 & X_d^l \end{bmatrix}, g^l = \begin{bmatrix} p^l \\ d^l \end{bmatrix}, n^l = \begin{bmatrix} w^l \\ z \end{bmatrix}, \text{ for} \quad (16)$$

$l = 1, 2, \ldots, L$, and $$(\hat{h}^l)^{(i+1)} = \underbrace{\mathbb{E}_{X|\hat{g}^{(i)},y}[R_{h^l g} (R_{g^l g^l} + ((X^l)^* R_{n^l n^l}^{-1} X^l)^{-1})^{-1} (X^l)^{-1}]}_{\text{single-layer iterative MMSE for layer } l} \underbrace{\begin{bmatrix} y_p^l \\ \tilde{y}_d^l \end{bmatrix}}_{\text{IC output}}, \quad (17)$$

where $$\tilde{y}_d^l = \begin{cases} y_d^l - \sum_{k \neq l} \mathbb{E}_{X^l|\hat{g}^{(i)},y}[X_d^k] d^k, & \text{soft IC,} \\ y_d^l - \sum_{k \neq l} (\hat{X}_d^k)^{(i)} d^k, & \text{hard IC.} \end{cases} \quad (18)$$

For soft decision or hard decision interference cancellation plus single-layer iterative MMSE-soft decision, Equation (19) is defined as follows:

$$(\hat{h}^l)^{(i+1)} = \underbrace{\frac{R_{h^l g} (R_{g^l g^l} + (\mathbb{E}_{X^l|\hat{g}^{(i)},y}[(X^l)^* R_{n^l n^l}^{-1} X^l])^{-1})^{-1}}{(\mathbb{E}_{X^l|\hat{g}^{(i)},y}[(X^l)^* R_{n^l n^l}^{-1} X^l])^{-1}}}_{\text{single-layer iterative MMSE -soft for layer } l} \underbrace{\begin{bmatrix} y_p^l \\ \tilde{y}_d^l \end{bmatrix}}_{\text{IC output}} \quad (19)$$

For soft decision or hard decision interference cancellation plus single-layer iterative MMSE-hard decision, Equation (20) is defined as follows:

$$(\hat{h}^l)^{(i+1)} = \underbrace{R_{h^l g} \left( R_{g^l g^l} + \left( ((\hat{X}^{(i)})^*) R_{n^l n^l}^{-1} (\hat{X}^{(i)}) \right)^{-1} \right)^{-1} \left( (\hat{X}^{(i)})^* \right)^{-1}}_{\text{single-layer iterative MMSE -hard for layer } l} \underbrace{\begin{bmatrix} y_p^l \\ \tilde{y}_d^l \end{bmatrix}}_{\text{IC output}}. \quad (20)$$

The equations above cover data-aided CE for single-layer signals (e.g., L=1). However, the equations above may be simplified in Equation (21) as follows, since the matrix $X^* R_{zz}^{-1} X$ is invertible:

$$y = \begin{bmatrix} y_p^1 \\ y_d \end{bmatrix}, X = X^1 = \begin{bmatrix} I_p^1 & 0 \\ 0 & X_d^1 \end{bmatrix}, g = g^1 = \begin{bmatrix} p^1 \\ d^1 \end{bmatrix}, \quad (21)$$

$$n = n^1 = \begin{bmatrix} w^1 \\ z \end{bmatrix}.$$

Based on Equations (13), (14), and (15) above, the Equations (22)-(24) for iterative MMSE, iterative MMSE-soft, and iterative MMSE-hard, respectively, are defined below.

For iterative MMSE, Equation (22) is defined as follows:

$$(\hat{h}^1)^{(i+1)} = \mathbb{E}_{X|\hat{g}^{(i)},y}[R_{h^1g}(R_{gg} + (X^*R_{nn}^{-1}X)^{-1})^{-1}X^{-1}]y. \quad (22)$$

For iterative MMSE-soft, Equation (23) is defined as follows:

$$(\hat{h}^1)^{(i+1)} = R_{h^1g}(R_{gg} + (\mathbb{E}_{X|\hat{g}^{(i)},y}[X^*R_{nn}^{-1}X])^{-1})^{-1}(\mathbb{E}_{X|\hat{g}^{(i)},y}[X^*R_{nn}^{-1}X])^{-1}\mathbb{E}_{X|\hat{g}^{(i)},y}[X^*]R_{nn}^{-1}y. \quad (23)$$

For iterative MMSE-hard, Equation (24) is defined as follows:

$$(\hat{h}^1)^{(i+1)} = R_{h^1g}(R_{gg} + ((\hat{X}^{(i)})^*R_{nn}^{-1}\hat{X}^{(i)})^{-1})^{-1}(\hat{X}^{(i)})^{-1}y. \quad (24)$$

After soft decision or hard decision cancellation of interfering layers, a single-layer method may be employed for multi-layer signals to reduce complexity, as in Equations (17), (19), and (20) above.

For data-aided CE, assuming the presence of AWGN reduces filtering complexity significantly. Complexity does not increase exponentially when the number of observations for data signals increases, which is beneficial in improving CE performance by using a large number of data signal observations for a slow-fading channel.

If $h^l$ is a channel of layer l, where h is define in Equation (25) as follows:

$$h = \begin{bmatrix} h^1 \\ h^2 \\ \vdots \\ h^L \end{bmatrix}. \quad (25)$$

In an embodiment of the present disclosure, $x^l_d$ is a column vector consisting of diagonal elements of $X^l_d$, and $1^l_p$ is a column vector of ones with size $|p^l|$, where $|p^l|$ denotes a number of elements of vector $p^l$.

For iterative MMSE, and assuming AWGN, the iterative MMSE reduces to Equations (26)-(29) as follows:

$$\hat{h}^{(i+1)} = \mathbb{E}_{X|\hat{g}^{(i)},y}[(W^*W + \sigma^2 I)^{-1}W^*y], \text{ where} \quad (26)$$

$$W = \begin{bmatrix} 1^1_p & 0 & \cdots & 0 \\ 0 & 1^2_p & \cdots & 0 \\ \vdots & \vdots & \ddots & \vdots \\ 0 & 0 & \cdots & 1^L_p \\ x^1_d & x^2_d & \cdots & x^L_d \end{bmatrix}, \quad (27)$$

$$W^*W = \begin{bmatrix} (x^1_d)^*x^1_d & (x^1_d)^*x^2_d & \cdots & (x^1_d)^*x^L_d \\ (x^2_d)^*x^1_d & (x^2_d)^*x^2_d & \cdots & (x^2_d)^*x^L_d \\ \vdots & \vdots & \ddots & \vdots \\ (x^L_d)^*x^1_d & (x^L_d)^*x^2_d & \cdots & +(x^L_d)^*x^L_d \end{bmatrix} + \begin{bmatrix} |p^1| & 0 & \cdots & 0 \\ 0 & |p^2| & \cdots & 0 \\ \vdots & \vdots & \ddots & \vdots \\ 0 & 0 & \cdots & |p^L| \end{bmatrix}, \quad (28)$$

and $$W^*y = \begin{bmatrix} \text{sum}(y^1_p) + (x^1_d)^*y_d \\ \text{sum}(y^2_p) + (x^2_d)^*y_d \\ \vdots \\ \text{sum}(y^L_p) + (x^L_d)^*y_d \end{bmatrix}. \quad (29)$$

For iterative MMSE-soft, Equation (30) is as follows:
$$\hat{h}^{(i+1)} = (\mathbb{E}_{X|\hat{g}^{(i)},y}[W^*W] + \sigma^2 I)^{-1}\mathbb{E}_{X|\hat{g}^{(i)},y}[W^*]y. \quad (30)$$

For iterative MMSE-hard, Equations (31)-(35) are as follows:

$$\hat{h}^{(i+1)} = ((\hat{W}^{(i)})^*\hat{W}^{(i)} + \sigma^2 I)^{-1}(\hat{W}^{(i)})^*y, \text{ where} \quad (31)$$

$$\hat{W}^{(i)} = \begin{bmatrix} 1^1_p & 0 & \cdots & 0 \\ 0 & 1^2_p & \cdots & 0 \\ \vdots & \vdots & \ddots & \vdots \\ 0 & 0 & \cdots & 1^L_p \\ (\hat{x}^1_d)^{(i)} & (\hat{x}^2_d)^{(i)} & \cdots & (\hat{x}^L_d)^{(i)} \end{bmatrix}, \text{ for} \quad (32)$$

$$(\hat{x}^l_d)^{(i)} = \arg\max_s P(x^l_d = s \mid \hat{h}^{(i)}, y), \text{ where} \quad (33)$$

$$(\hat{W}^{(i)})^*\hat{W}^{(i)} = \begin{bmatrix} (\hat{x}^1_d)^*\hat{x}^1_d & (\hat{x}^1_d)^*\hat{x}^2_d & \cdots & (\hat{x}^1_d)^*\hat{x}^L_d \\ (\hat{x}^2_d)^*\hat{x}^1_d & (\hat{x}^2_d)^*\hat{x}^2_d & \cdots & (\hat{x}^2_d)^*\hat{x}^L_d \\ \vdots & \vdots & \ddots & \vdots \\ (\hat{x}^L_d)^*\hat{x}^1_d & (\hat{x}^L_d)^*\hat{x}^2_d & \cdots & (\hat{x}^L_d)^*\hat{x}^L_d \end{bmatrix} + \begin{bmatrix} |p^1| & 0 & \cdots & 0 \\ 0 & |p^2| & \cdots & 0 \\ \vdots & \vdots & \ddots & \vdots \\ 0 & 0 & \cdots & |p^L| \end{bmatrix}, \quad (34)$$

and $$(\hat{W}^{(i)})^*y = \begin{bmatrix} \text{sum}(y^1_p) + (\hat{x}^1_d)^*y_d \\ \text{sum}(y^2_p) + (\hat{x}^2_d)^*y_d \\ \vdots \\ \text{sum}(y^L_p) + (\hat{x}^L_d)^*y_d \end{bmatrix}. \quad (35)$$

For data-aided iterative CE, iterative MMSE, iterative MMSE-soft decision or iterative MMSE-hard decision methods may be used. Depending on the MCS/SNR/channel profile, an embodiment of the present disclosure assumes AWGN.

FIG. 1 is a block diagram of an apparatus 100 for data-aided iterative CE with feedback from a detector 103, according to an embodiment of the present disclosure.

Iterative CE improves CE performance by utilizing the feedback from the detector 103. The present disclosure describes data-aided CE using the information of data, i.e., log likelihood ratios (LLRs) of data symbols, fed back from the detector 103.

Referring to FIG. 1, the apparatus 100 includes a CE module 101, the detector 103, and a decoder 105.

The CE module 101 includes a first input for receiving pilot RE observations, a second input for receiving data RE observations, a third input for receiving LLRs from data symbols fed back from the detector 103, and an output for providing CEs.

The detector 103 includes a first input connected to the output of the CE module 101 for receiving CEs, a second input for receiving data RE observations, and an output connected to the third input of the CE module 101 for providing LLRs from data symbols.

The decoder 105 includes an input connected to the output of the detector 103 for receiving LLRs of data symbols, and an output for providing decoded data symbols.

Figure 2:
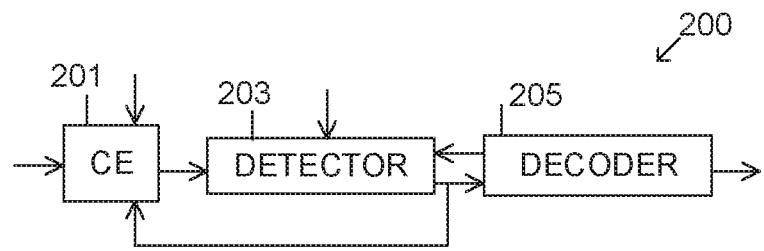
FIG. 2 is a block diagram of an apparatus for data-aided iterative CE with feedback from a detector and iterative detection and decoding (IDD), according to an embodiment of the present disclosure.

FIG. 2 is a block diagram of an apparatus 200 for data-aided iterative CE with feedback from a detector 203 and IDD, according to an embodiment of the present disclosure.

Referring to FIG. 2, the apparatus 200 includes a CE module 201, the detector 203, and a decoder 205.

The CE module 201 includes a first input for receiving pilot RE observations, a second input for receiving data RE observations, a third input for receiving LLRs from data symbols fed back from the detector 203, and an output for providing CEs.

The detector 203 includes a first input connected to the output of the CE module 201 for receiving CEs, a second input for receiving data RE observations, a third input for receiving decoded data symbols from the decoder 205 for performing IDD, and an output connected to the third input of the CE module 201 for providing LLRs from data symbols.

The decoder 205 includes an input connected to the output of the detector 103 for receiving LLRs of data symbols, a first output connected to the third input of the detector 203 for providing decoded data symbols to the detector 203, and a second output for providing decoded data symbols.

Figure 3:
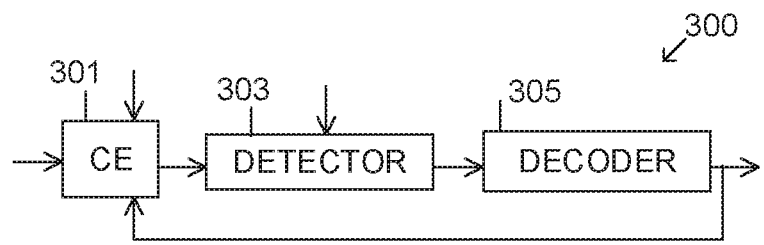
FIG. 3 is a block diagram of an apparatus for data-aided iterative CE with feedback from a decoder, according to an embodiment of the present disclosure.

FIG. 3 is a block diagram of an apparatus 300 for data-aided iterative CE with feedback from a decoder 305, according to an embodiment of the present disclosure. Iterative CE improves CE performance by utilizing the feedback from the decoder. The present disclosure describes data-aided CE using the information of data, i.e., log likelihood ratios (LLRs) of data symbols, fed back from the decoder.

Referring to FIG. 3, the apparatus 300 includes a CE module 301, a detector 303, and the decoder 305.

The CE module 301 includes a first input for receiving pilot RE observations, a second input for receiving data RE observations, a third input for receiving LLRs from data symbols fed back from the decoder 305, and an output for providing CEs.

The detector 303 includes a first input connected to the output of the CE module 301 for receiving CEs, a second input for receiving data RE observations, and an output for providing LLRs from data symbols.

The decoder 305 includes an input connected to the output of the detector 303 for receiving LLRs of data symbols, and an output connected to the third input of the CE module 301 for providing decoded data symbols.

Figure 4:
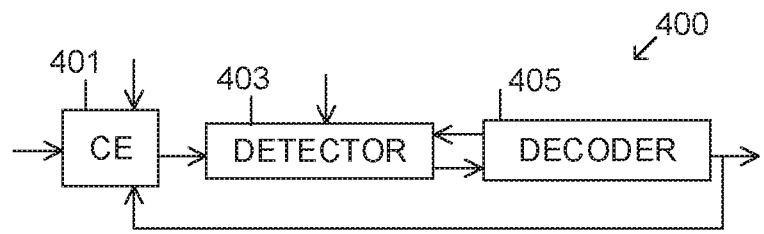
FIG. 4 is a block diagram of an apparatus for data-aided iterative CE with feedback from a decoder and IDD, according to an embodiment of the present disclosure, according to an embodiment of the present disclosure.

FIG. 4 is a block diagram of an apparatus 400 for data-aided iterative CE with feedback from a decoder 405 and IDD, according to an embodiment of the present disclosure, according to an embodiment of the present disclosure.

Referring to FIG. 4, the apparatus 400 includes a CE module 401, a detector 403, and the decoder 405.

The CE module 401 includes a first input for receiving pilot RE observations, a second input for receiving data RE observations, a third input for receiving LLRs from data symbols fed back from the decoder 405, and an output for providing CEs.

The detector 403 includes a first input connected to the output of the CE module 401 for receiving CEs, a second input for receiving data RE observations, a third input for receiving decoded data symbols from the decoder 405 for performing IDD, and an output for providing LLRs from data symbols.

The decoder 405 includes an input connected to the output of the detector 403 for receiving LLRs of data symbols, a first output connected to the third input of the detector 403 for providing decoded data symbols to the detector 403, and a second output connected to the third input of the CE module 401 for providing LLRs from data symbols.

Figure 5:
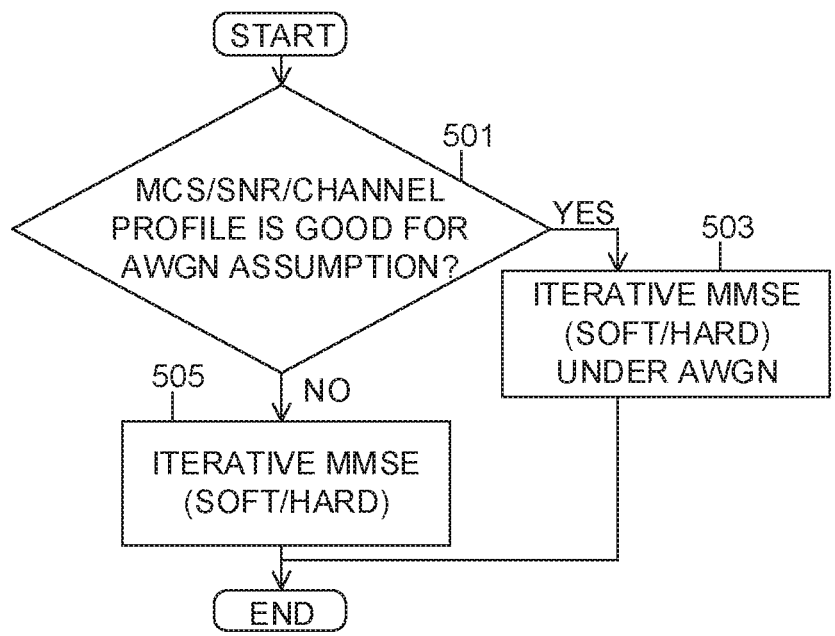
FIG. 5 is a flowchart of a method of selecting either iterative minimum mean square error (MMSE) or iterative MMSE under additive white Gaussian noise (AWGN) for data-aided iterative CE, according to an embodiment of the present disclosure.

FIG. 5 is a flowchart of a method of selecting either iterative MMSE or iterative MMSE assuming AWGN for data-aided iterative CE, according to an embodiment of the present disclosure. For multi-layer signals, either multi-layer methods or single-layer methods after interference layer cancellation may be employed.

Referring to FIG. 5, the present system determines whether AWGN is assumed based on a MCS/SNR/channel profile at 501.

At 503, if the present system determines that AWGN is assumed based on the MCS/SNR/channel profile, the present system performs an iterative MMSE soft decision or an iterative MMSE hard decision assuming AWGN.

At 505, if the present system determines that AWGN is not assumed based on the MCS/SNR/channel profile, the present system performs an iterative MMSE soft decision or an iterative MMSE hard decision without assuming AWGN.

Figure 6:
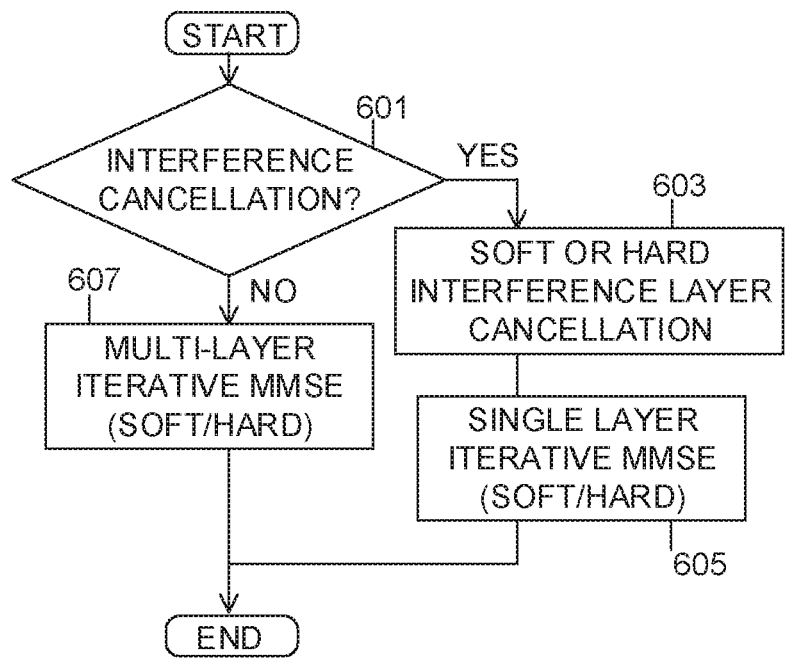
FIG. 6 is a flowchart of a method of selecting either multi-layer iterative MMSE or single-layer iterative MMSE for data-aided iterative CE based on interference cancellation, according to an embodiment of the present disclosure.

FIG. 6 is a flowchart of a method of selecting either multi-layer iterative MMSE or single-layer iterative MMSE for data-aided iterative CE based on interference cancellation, according to an embodiment of the present disclosure.

Referring to FIG. 6, the present system determines whether interference layers in a signal is cancelled at 601.

At 603, if the present system determines that interference layers in a signal is cancelled, the present system performs a soft decision or hard decision interference layer cancellation on the signal.

At 605, the present system performs single-layer iterative MMSE on the interference cancelled signal.

At 607, if the present system determines that interference layers in the signal are not cancelled, the present system performs a soft decision or hard decision interference layer cancellation on the signal without interference layer cancellation.

Figure 7:
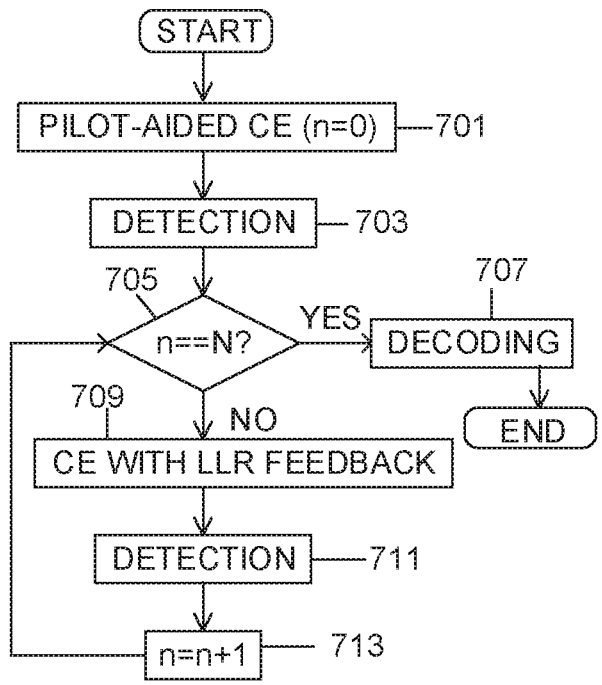
FIG. 7 is a flowchart of a method of single-layer data-aided iterative CE with feedback from detection, according to an embodiment of the present disclosure.

FIG. 7 is a flowchart of a method of single-layer data-aided iterative CE with feedback from detection, according to an embodiment of the present disclosure.

Referring to FIG. 7, the present system performs pilot-aided CE a first time, where a counter n is set to 0 at 701.

At 703, the present system performs detection on the pilot-aided CE.

At 705, the present system determines whether the counter n is equal to a pre-determined number of iterations N.

At 707, if n is equal to N, the present system performs decoding and the method of FIG. 7 is terminated.

At 709, if n is not equal to N, the present system performs data-aided CE using LLR from the detection.

At 711, the present system performs detection on the data-aided CE.

At 713, n is incremented by 1 and the method of FIG. 7 returns to 705.

Figure 8:
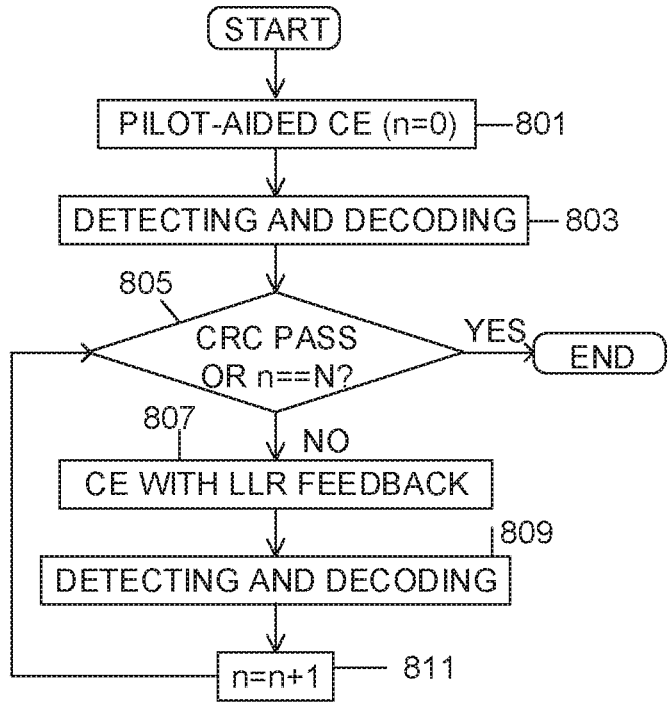
FIG. 8 is a flowchart of a method of single-layer data-aided iterative CE with feedback from decoding, according to an embodiment of the present disclosure.

FIG. 8 is a flowchart of a method of single-layer data-aided iterative CE with feedback from decoding, according to an embodiment of the present disclosure. For multi-layer signals, data-aided CE may be used after an update of detector or decoder feedback for each layer. For reducing complexity, data-aided CE may be used after an update of detector or decoder feedback of selected layers.

Referring to FIG. 8, the present system performs pilot-aided CE a first time, where a counter n is set to 0 at 801.

At 803, the present system performs detection and decoding on the pilot-aided CE.

At 805, the present system determines if a cyclic redundancy check (CRC) passes or if n is equal to a pre-determined number of iterations N. If n is equal to N, the present system terminates the method of FIG. 8.

At 807, if the CRC does not pass and n is not equal to N, the present system performs data-aided CE using LLR from the decoding.

At 809, the present system performs detection and decoding on the data-aided CE.

At 811, n is incremented by 1 and the method of FIG. 8 returns to 805.

Figure 9:
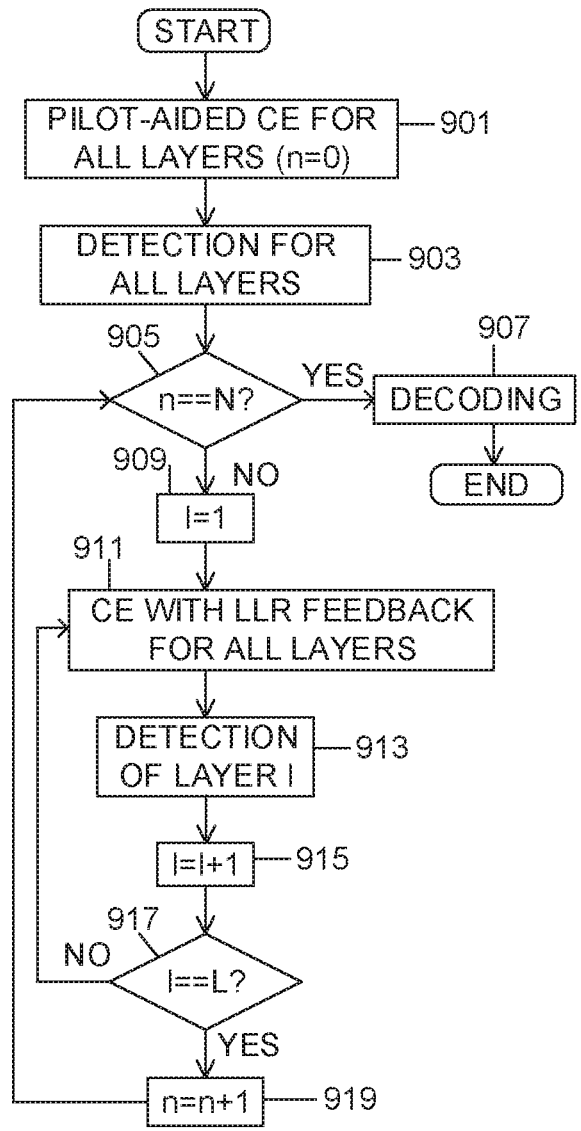
FIG. 9 is a flowchart of a method of multi-layer data-aided iterative CE with feedback from detection, according to an embodiment of the present disclosure.

FIG. 9 is a flowchart of a method of multi-layer data-aided iterative CE with feedback from detection, according to an embodiment of the present disclosure.

Referring to FIG. 9, the present system performs pilot-aided CE a first time for all layers, where a counter n is set to 0 at 901.

At 903, the present system performs detection for all layers on the pilot-aided CE for all layers.

At 905, the present system determines if n is equal to a pre-determined number of iterations N.

At 907, if n is equal to N, decoding is performed and the present system terminates the method of FIG. 9.

At 909, if n is not equal to N, the present system sets a counter l (lowercase L) to 1.

At 911, the present system performs data-aided CE for all layers using LLR from the detection.

At 913, the present system performs detection on the data-aided CE of layer l.

At 915, l is incremented by 1.

At 917, the present system determines if l is equal to the total number of layers L. If l is not equal to L then the method of FIG. 9 returns to 911. If l is equal to L then the method of FIG. 9 proceeds to 919.

At 919, n is incremented by 1 and the method of FIG. 9 returns to 905.

Figure 10:
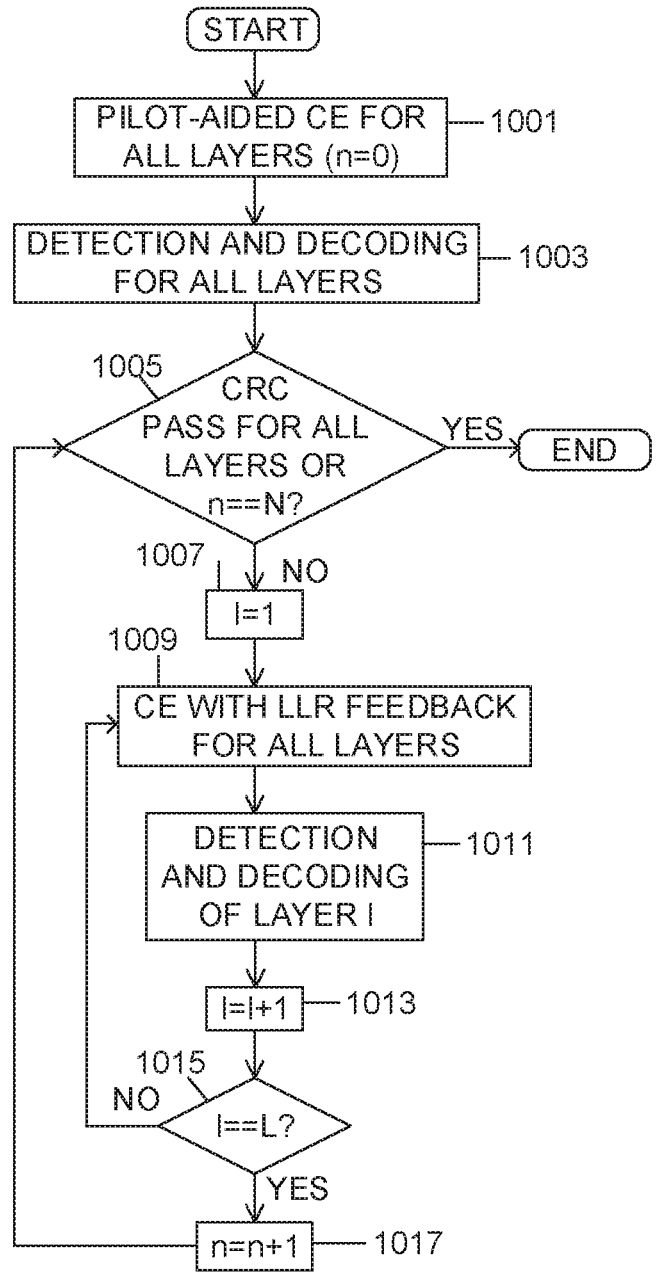
FIG. 10 is a flowchart of a method of multi-layer data-aided iterative CE with feedback from decoding, according to an embodiment of the present disclosure.

FIG. 10 is a flowchart of a method of multi-layer data-aided iterative CE with feedback from decoding, according to an embodiment of the present disclosure.

Referring to FIG. 10, the present system performs pilot-aided CE a first time for all layers, where the present system sets a counter n to 0 at 1001.

At 1003, the present system performs detection and decoding for all layers on the pilot-aided CE for all layers.

At 1005, the present system determines if CRC passes for all layers or if n is equal to a pre-determined number of iterations N. If CRC passes for all layers or n is equal to N, the method of FIG. 10 is terminated. If CRC does not pass for all layers and n is not equal to N, the method of FIG. 10 proceeds to 1007.

At 1007, the present system sets a counter l (lowercase L) to 1.

At 1009, the present system performs data-aided CE for all layers is using LLR from the detection and decoding.

At 1011, the present system performs detection and decoding on the data-aided CE of layer l.

At 1013, the present system increments l by 1.

At 1015, the present system determines if l is equal to the total number of layers L. If l is not equal to L then the method of FIG. 10 returns to 1009. If l is equal to L then the method of FIG. 10 proceeds to 1017.

At 1017, n is incremented by 1 and the method of FIG. 10 returns to 1005.

The present disclosure further describes low-complexity solutions for data-aided iterative CE using feedback information of data symbols from a detector or a decoder.

In an embodiment of the present disclosure, sequential filtering may be used, where CE using an observation of both pilot and data signals is processed in two steps (e.g., applying MMSE filtering using pilot signals only, and refining the pilot-aided MMSE CE using data signals). Sequential filtering reduces complexity, because a size of a matrix inversion is reduced for computing filtering matrices. The pilot-aided CE output and filtering matrices in an iterative step may be re-used for data-aided CE.

The present disclosure provides an approximate method of multi-tap filtering if a noise level is not AWGN (i.e., is not flat). Multi-tap filtering with a varying noise level may be processed in two steps (e.g., per-tap filtering to match the noise level, and multi-tap filtering assuming AWGN). In data-aided CE, the effective noise level relies on both the background noise and the uncertainty of data symbols that fluctuates depending on the feedback information of data. Therefore, the filtering matrix may change dynamically depending on the feedback, which results in a significant cost of on-the-fly computation of the filtering matrix for every feedback realization. In order to avoid this cost, per-tap filtering may be performed first to match the noise level, which depends on feedback realization, and then multi-tap filtering may be performed assuming AWGN. The multi-tap filtering matrix under the assumption of AWGN may be pre-computed and applied for all feedback realizations after per-tap filtering.

In an embodiment of the present disclosure, channel values are estimated using pilot and data signals in two sequential steps sequentially (e.g., applying MMSE filtering using pilot signals, and refining the pilot-aided MMSE CE using the observation data signals). In addition, multi-tap filtering may be performed in two steps (e.g., per-tap filtering to match the noise level, and multi-tap filtering assuming AWGN).

Sequential filtering reduces the complexity of CE using the observation of both pilot and data signals. If $N_p$ and $N_d$ are the numbers of pilot and data symbols utilized for channel estimation, respectively, the number of filtering taps is originally $N_p+N_d$. However, employing sequential filtering, the $(N_p+N_d)$-tap filtering may be performed in two steps with no performance loss (e.g., $N_p$-tap pilot-aided MMSE filtering and $N_d$-tap data-aided filtering). Data-aided filtering refines a pilot-aided MMSE filtering output by using the observation of $N_d$ data symbols. Data-aided filtering is of low complexity since it reuses a pilot-aided CE and filtering matrices.

The multi-tap filtering approximation may be employed to avoid a filtering matrix computation for every feedback realization. The filtering matrix may change dynamically depending on feedback since the effective noise level changes according to the feedback. That is, different filtering matrices are computed for different data feedback realizations. In order to avoid this, per-tap filtering is performed first to match the noise level and then multi-tap filtering is performed assuming AWGN. Per-tap filtering depends on the feedback realization, but it is of low complexity, since it is a per-tap operation. The multi-tap filtering matrix assuming AWGN may be precomputed and applied for all feedback realizations after per-tap filtering. In this way, a multi-tap filtering matrix need not need be re-calculated for different feedback realizations.

For a signal of L layers, where l=1, 2, . . . , L, $p^l$ is a column vector of the channels for pilots of layer l, and $y_p^l$ is the observation of the channels for pilot signals of layer l. If pilot signals for different layers are orthogonal, Equations (36) and (37) are as follows:

$$y_p^l = p^l + z_p^l, \text{ for } l = 1, 2, \ldots, L, \text{ i.e.,} \quad (36)$$

$$\underbrace{\begin{bmatrix} y_p^1 \\ \vdots \\ y_p^L \end{bmatrix}}_{y_p} = \underbrace{\begin{bmatrix} p^1 \\ \vdots \\ p^L \end{bmatrix}}_{p} + \underbrace{\begin{bmatrix} z_p^1 \\ \vdots \\ z_p^L \end{bmatrix}}_{z_p}, \quad (37)$$

where $z_p$ is the column vector of the background noise, which is independent to the pilot channels p and of zero mean and covariance $\sigma^2 I_p$. Even though white noise is considered in the present disclosure, the present disclosure is not limited thereto, and other forms of noise may be considered.

If $h^l$ are the channels of interest. The pilot-aided MMSE solution for the estimate of h is given by Equation (38) as follows:

$$\hat{h}_{pilot-aided}^l = R_{h^l p}(R_{pp} + \sigma^2 I_p)^{-1} y_p, \quad (38)$$

where $R_{h^l p}$ is a correlation matrix between $h^l$ and p, and $R_{pp}$ is an auto-correlation matrix of p.

If channel correlation across layers is not utilized or there is no channel correlation across layers, Equation (38) above reduces to Equation (39) as follows:

$$\hat{h}_{pilot-aided}^l = R_{h^l p^l}(R_{p^l p^l} + \sigma^2 I_p^l)^{-1} y_p^l, \quad (39)$$

where $R_{h^l p^l}$ is the correlation matrix between $h^l$ and $p^l$, and $R_{p^l p^l}$ is the auto-correlation matrix of $p^l$.

In an embodiment of the present disclosure, $X_d^l$ may be a diagonal matrix consisting of data symbols of layer l that is utilized in channel estimation and $y_d$ may be a vector of an observation for these data symbols. If $d^l$ is a vector of corresponding channels for $X_d^l$ then Equation (40) is as follows:

$$y_d = \sum_{l=1}^{L} X_d^l d^l + z_d = \underbrace{[X_d^1 \ldots X_d^L]}_{X_d} \underbrace{\begin{bmatrix} d^1 \\ \vdots \\ d^L \end{bmatrix}}_{d} + z_d. \quad (40)$$

Combining Equations (35) and (40) above renders Equation (41) as follows:

$$y = \begin{bmatrix} y_p \\ y_d \end{bmatrix} = \begin{bmatrix} I_p & 0 \\ 0 & X_d \end{bmatrix} \begin{bmatrix} p \\ d \end{bmatrix} + \begin{bmatrix} z_p \\ z_d \end{bmatrix}. \quad (41)$$

An iterative MMSE solution for $h^l$ using y is given by Equations (42) and (43) as follows:

$$(\hat{h}^l)^{(i+1)} = \mathbb{E}_{X_d|\hat{d}^{(i)}, y}\left[[R_{h^l p} \, R_{h^l d} X_d^*]\left(\begin{bmatrix} R_{pp} & R_{pd} X_d^* \\ X_d R_{dp} & X_d R_{dd} X_d^* \end{bmatrix} + \sigma^2 I\right)^{-1}\right] y \quad (42)$$

$$= \mathbb{E}_{X_d|\hat{d}^{(i)}, y}\left[[R_{h^l p} \, R_{h^l d}]\left(\begin{bmatrix} I_p & 0 \\ 0 & X_d^* X_d \end{bmatrix}\begin{bmatrix} R_{pp} & R_{pd} \\ R_{dp} & R_{dd} \end{bmatrix} + \sigma^2 I\right)^{-1}\begin{bmatrix} I_p & 0 \\ 0 & X_d^* \end{bmatrix}\right] y$$

for $$\hat{d}^{(0)} = \hat{d}_{pilot-aided}, \quad (43)$$

where $R_{AB}$ is a correlation matrix between A and B, and $R_{AA}$ is an auto-correlation matrix of A. Detector or decoder LLR feedback provides a distribution of X given y and some channel estimate $\hat{d}^{(i)}$ of an initial or previous iteration, i.e., $P(X|\hat{d}^{(i)}, y)$.

For computing iterative MMSE, MMSE filtering is performed for each candidate of $X_d$ and an expectation is taken. Iterative MMSE-soft decision reduces complexity by taking an expectation first and then doing MMSE filtering as in Equations (44) and (45) as follows:

$$(\hat{h}^l)^{(i+1)} = [R_{h^l p} \, R_{h^l d}]\underbrace{\left(\begin{bmatrix} I_p & 0 \\ 0 & \Sigma_d^{(i)} \end{bmatrix}\begin{bmatrix} R_{pp} & R_{pd} \\ R_{dp} & R_{dd} \end{bmatrix} + \sigma^2 I\right)^{-1}}_{(|p|+|d|) \times (|p|+|d|) \text{ matrix}}\begin{bmatrix} I_p & 0 \\ 0 & \mu_d^{(i)} \end{bmatrix} y. \quad (44)$$

where $$\mu_d^{(i)} = \mathbb{E}\left[X_d | \hat{d}^{(i)}, y\right], \Sigma_d^{(i)} = \mathbb{E}\left[X_d^* X_d | \hat{d}^{(i)}, y\right]. \quad (45)$$

A filtering matrix may be computed by using first and second moments of $X_d$ and channel correlation matrices.

The present system may use a hard decision output for $X_d$ instead of taking an expectation, which results in Equation (46) as follows:

$$(\hat{h}^l)^{(i+1)} = [R_{h^l p} \, R_{h^l d}] \quad (46)$$

$$\underbrace{\left(\begin{bmatrix} I_p & 0 \\ 0 & (\hat{X}_d^{(i)})^* \hat{X}_d^{(i)} \end{bmatrix}\begin{bmatrix} R_{pp} & R_{pd} \\ R_{dp} & R_{dd} \end{bmatrix} + \sigma^2 I\right)^{-1}}_{(|p|+|d|) \times (|p|+|d|) \text{ matrix}}\begin{bmatrix} I_p & 0 \\ 0 & (\hat{X}_d^{(i)})^* \end{bmatrix} y,$$

where $\hat{X}_d^{(i)} = \underset{s}{\operatorname{argmax}} P(X_d = s | \hat{d}^{(i)}, y)$.

Sequential filtering includes two steps (e.g., applying MMSE using pilot signals only, and refining the pilot-aided MMSE output by using the observation of data symbols).

For iterative MMSE, Equations (47)-(49) may be as follows:

$$(\hat{h}^l)^{(i+1)} = \hat{h}^k_{pilot-aided} + \tilde{R}_{h^l d} \quad (47)$$

$$\mathbb{E}_{X_d|\hat{g}^{(i)},y}[(X_d^* X_d \tilde{R}_{dd} + \sigma^2 I)^{-1}(X_d^* y_d - X_d^* X_d \hat{d}_{pilot-aided})], \text{ where}$$

$$\tilde{R}_{h^l d} = R_{h^l d} - \underbrace{R_{h^l p}(R_{pp} + \sigma^2 I)^{-1}}_{=W_{h^l p}} R_{pd}, \text{ and} \quad (48)$$

$$\tilde{R}_{dd} = R_{dd} - \underbrace{R_{dp}(R_{pp} + \sigma^2 I)^{-1}}_{=W_{dp}} R_{pd}$$

$$\hat{h}^l_{pilot-aided} = R_{h^l p}(R_{pp} + \sigma^2 I)^{-1} y_p, \; \hat{d}_{pilot-aided} = R_{dp}(R_{pp} + \sigma^2 I)^{-1} y_p, \quad (49)$$

where $\hat{h}_{pilot-aided}^l$ and $\hat{d}_{pilot-aided}$ are pilot-aided MMSE channel estimation outputs, and $W_{h^l p}$ and $W_{dp}$ are pilot-aided MMSE filtering matrices, which are available after pilot-aided channel estimation.

For iterative MMSE-soft, Equation (50) is as follows:

$$(\hat{h}^l)^{(i+1)} = \hat{h}^l_{pilot-aided} + \tilde{R}_{h^l p}\underbrace{(\Sigma_d^{(i)} \tilde{R}_{dd} + \sigma^2 I)^{-1}}_{|d|\times|d|\, matrix}(\mu_d^{(i)} y_d - \Sigma_d^{(i)} \hat{d}_{pilot-aided}), \quad (50)$$

For iterative MMSE-hard, Equation (51) is as follows:

$$(\hat{h}^l)^{(i+1)} = \hat{h}_{pilot-aided} + \quad (51)$$

$$\tilde{R}_{h^l p}\underbrace{((\hat{X}_d^{(i)})^* \hat{X}_d^{(i)} \tilde{R}_{dd} + \sigma^2 I)^{-1}}_{|d|\times|d|\, matrix}((\hat{X}_d^{(i)})^* y_d - (\hat{X}_d^{(i)})^* \hat{X}_d^{(i)} \hat{d}_{pilot-aided}).$$

Comparing Equations (44) and (46) to Equations (50) and (51), the number of matrix inversions that are required is reduced from $(|p|+|d|)\times(|p|+|d|)$ to $|d|\times|d|$ by sequential filtering, where $|p|$ and $|d|$ are the numbers of pilot and data signals in p and d, respectively.

The equations in the above section cover single-layer cases (L=1). However, they may be simplified further as follows since the matrix $X^*X$ is invertible.

For iterative MMSE, Equation (52) is as follows:

$$(\hat{h}^1)^{(i+1)} = \hat{h}^1_{pilot-aided} + \quad (52)$$

$$\tilde{R}_{h^1 p}\mathbb{E}_{X_d|\hat{g}^{(i)},y}[(\tilde{R}_{dd} + \sigma^2(X_d^* X_d)^{-1})^{-1}(X_d^{-1} y_d - \hat{d}_{pilot-aided})],$$

For iterative MMSE-soft, Equation (53) is as follows:

$$(\hat{h}^1)^{(i+1)} = \quad (53)$$

$$\hat{h}^1_{pilot-aided} + \tilde{R}_{h^1 d}(\tilde{R}_{dd} + \sigma^2(\Sigma_d^{(i)})^{-1})^{-1}((\Sigma_d^{(i)})^{-1} \mu_d^{(i)} y_d - \hat{d}_{pilot-aided}),$$

For iterative MMSE-hard, Equation (54) is as follows:

$$(\hat{h}^1)^{(i+1)} = \hat{h}^1_{pilot-aided} + \quad (54)$$

$$\tilde{R}_{h^1 d}(\tilde{R}_{dd} + \sigma^2((\hat{X}_d^{(i)})^* \hat{X}_d^{(i)})^{-1})^{-1}((\hat{X}_d^{(i)})^{-1} y_d - \hat{d}_{pilot-aided}).$$

Figure 11:
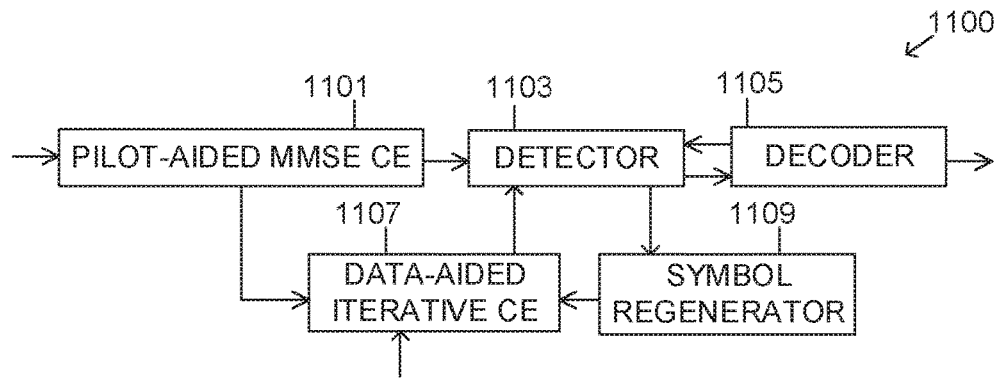
FIG. 11 is a block diagram of an apparatus for sequential filtering for single-layer data-aided iterative CE with feedback from a detector, according to an embodiment of the present disclosure.

FIG. 11 is a block diagram of an apparatus 1100 for sequential filtering for single-layer data-aided iterative CE with feedback from a detector 1103, according to an embodiment of the present disclosure.

Referring to FIG. 11, the apparatus 1100 includes a pilot-aided MMSE CE module 1101, the detector 1103, a decoder 1105, a data-aided iterative CE module 1107, and a symbol regenerator module 1109.

The pilot-aided MMSE CE module 1101 includes a first input for receiving pilot RE observations $y_p$, a first output for providing $\hat{h}^{(0)}$, and a second output for providing $\hat{h}^{(0)}$ and $\hat{d}^{(0)}$.

The detector 1103 includes a first input connected to the first output of the pilot-aided MMSE CE module 1101 for receiving $\hat{h}^{(0)}$, a second input for receiving $\hat{h}^{(i+1)}$, a third input for receiving extrinsic LLR from the decoder 1105, a first output for providing LLRs from data symbols, and a second output for providing a posteriori LLR ($P(X|\hat{d}^{(i)}, y)$).

The decoder 1105 includes an input connected to the output of the detector 1103 for receiving LLRs of data symbols, a first output connected to the third input of the detector 1103 for providing extrinsic LLR, and a second output for providing decoded data symbols.

The data-aided iterative CE module 1107 includes a first input for receiving data RE observations $y_d$, a second input connected to the second output of the pilot-aided MMSE CE 1101, a third input connected to the output of the symbol regenerator module 1109, and an output connected to the second input of the detector 1103.

The symbol regenerator module 1109 includes an input connected to the second output of the detector 1105, and an output connected to the third input of the data-aided iterative CE 1107.

Figure 12:
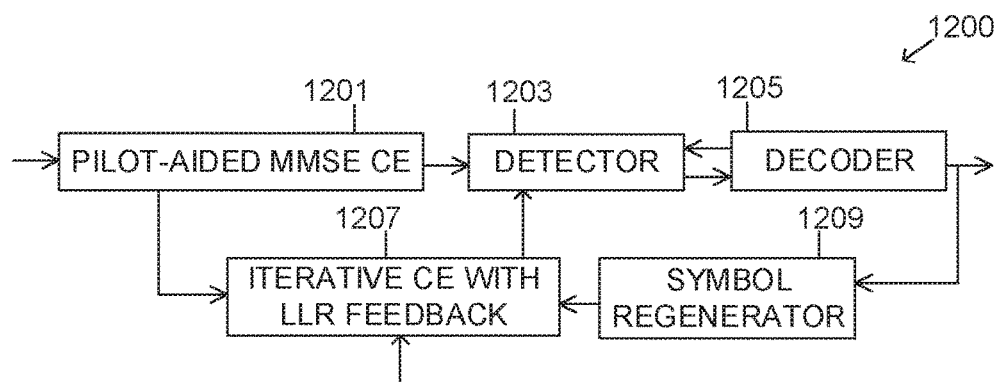
FIG. 12 is a block diagram of an apparatus for sequential filtering for single-layer data-aided iterative CE with feedback from a decoder, according to an embodiment of the present disclosure.

FIG. 12 is a block diagram of an apparatus 1200 for sequential filtering for single-layer data-aided iterative CE with feedback from a decoder 1205, according to an embodiment of the present disclosure. IDD is optional.

Referring to FIG. 12, the apparatus 1200 includes a pilot-aided MMSE CE module 1201, the detector 1203, a decoder 1205, a data-aided iterative CE module 1207, and a symbol regenerator module 1209.

The pilot-aided MMSE CE module 1201 includes a first input for receiving pilot RE observations $y_p$, a first output for providing $\hat{h}^{(0)}$, and a second output for providing $\hat{h}^{(0)}$ and $\hat{d}^{(0)}$.

The detector 1203 includes a first input connected to the first output of the pilot-aided MMSE CE module 1201 for receiving $\hat{h}^{(0)}$, a second input for receiving $\hat{h}^{(i+1)}$, a third input for receiving extrinsic LLR from the decoder 1205, and an output connected to the symbol regenerator 1209 for providing LLRs from data symbols.

The decoder 1205 includes an input connected to the output of the detector 1203 for receiving LLRs of data symbols, and an output for providing a posteriori LLR ($P(X|\hat{d}^{(i)}, y)$).

The data-aided iterative CE module 1207 includes a first input for receiving data RE observations $y_d$, a second input connected to the second output of the pilot-aided MMSE CE 1201, a third input connected to the output of the symbol regenerator module 1109, and an output connected to the second input of the detector 1203.

The symbol regenerator module 1209 includes an input connected to the output of the detector 1205, and an output connected to the third input of the data-aided iterative CE 1207.

An embodiment of the present disclosure includes filtering matrices in iterative MMSE-soft/hard as in Equations (53) and (54) above. The filtering matrices depend on feedback information of data symbols. For every realization of data feedback, the matrix inversion is re-calculated, which is a significant cost. To avoid matrix inversion for every feedback realization, per-tap filtering may be performed first to match a noise level, which depends on feedback realization, and then multi-tap filtering is performed assuming AWGN.

Figure 13:
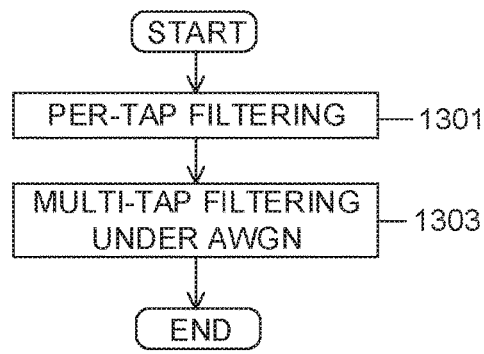
FIG. 13 is a flowchart of a method of multi-tap filtering approximation, according to an embodiment of the present disclosure.

FIG. 13 is a flowchart of a method of multi-tap filtering approximation, according to an embodiment of the present disclosure. Per-tap filtering is optional.

At 1301, the present system performs per-tap filtering.

At 1303, the present system performs multi-tap filtering assuming AWGN.

For iterative MMSE-soft, Equation (55) is as follows:

$$\tilde{R}_{h^1 d}(\tilde{R}_{dd} + \sigma^2 (\Sigma_d^{(i)})^{-1})^{-1} \approx \underbrace{\tilde{R}_{h^1 d}(\tilde{R}_{dd} + \alpha\sigma^2 I)^{-1}}_{\text{Multi-tap filtering under white noise}} \underbrace{diag(\tilde{R}_{dd} + \alpha\sigma^2 I) diag(\tilde{R}_{dd} + \sigma^2 (\Sigma_d^{(i)})^{-1})^{-1}}_{\text{per-tap filtering}}, \quad (55)$$

where $diag(A)$ denotes a diagonal matrix consisting of diagonal elements of A, and $\alpha$ is a scalar design parameter that can be optimized.

For iterative MMSE-hard, Equation (56) is as follows:

$$\tilde{R}_{h^1 d}(\tilde{R}_{dd} + \sigma^2 ((\hat{X}_d^{(i)})^* \hat{X}_d^{(i)})^{-1})^{-1} \approx \underbrace{\tilde{R}_{h^1 d}(\tilde{R}_{dd} + \alpha\sigma^2 I)^{-1}}_{\text{Multi-tap filtering under white noise}} \quad (56)$$

$$\underbrace{diag(\tilde{R}_{dd} + \alpha\sigma^2 I) diag(\tilde{R}_{dd} + \sigma^2 ((\hat{X}_d^{(i)})^* \hat{X}_d^{(i)})^{-1})^{-1}}_{\text{per-tap filtering}}.$$

In an embodiment of the present disclosure, data RE selection is provided for data-aided CE to improve performance of 2D and 2×1D frequency domain CE in orthogonal frequency-division multiplexing (OFDM) systems. Dynamic RE selection is based on channel correlation and data feedback information, as well as fixed data RE locations.

In an embodiment of the present disclosure, data-aided iterative CE is applied to 2D frequency domain CE. In particular, data RE selection is based on sorting and thresholding REs for performance improvement. In order to choose REs that are closer to a target RE (choosing REs having a greater correlation to the target RE), data REs are sorted by channel correlation to the target RE, and data REs are selected in the descending order of channel correlation. To select reliable data REs, data REs having variance, computed from feedback LLR, which are less than a predefined threshold value are selected.

In an embodiment of the present disclosure, a fixed data RE selection method is provided, where data REs at a fixed location are used for data-aided CE in a pre-defined resource block (RB). An RB may be divided into several sub-blocks so that data REs are used at fixed locations for data-aided CE. By limiting the locations of data REs used in the data-aided CE, complexity of computing different filtering matrices for different data RE locations is reduced. The present disclosure also includes data-aided iterative CE for 2×1D channel estimation. In this case, the data-aided CE is used to refine frequency domain (FD) MMSE CE. The time domain (TD) interpolation remains the same.

In an embodiment of the present disclosure, data-aided iterative CE is implemented in addition to 2×1D CE including FD MMSE across subcarriers and TD interpolation across OFDM symbols. In this case, the data-aided iterative CE is employed to refine the FD MMSE CE while the TD interpolation remains the same. Using a 2×1D method, a greater number of data RE observations for CE in low complexity may be utilized, leading to better performance.

In an embodiment of the present disclosure, a data RE is selected that is closer to a target RE (e.g., the selected RE has a greater correlation to the target RE) by sorting for improving data-aided CE performance. In addition, a reliable data RE may be selected by using variance computed from feedback LLR for improving data-aided CE performance. Furthermore, fixed data RE locations may be used to reduce complexity. Moreover, data-aided iterative CE may be applied for the 2×1D channel estimation framework.

For each target channel $h^l$, a set of data REs for d is determined for dynamic data RE selection by sorting and thresholding. For data RE selection, it is preferred to use a greater number of data REs, data REs that are closer to the target, and more reliable data REs.

For sorting, in order to choose data REs that are closer to a target (e.g., data REs that have a greater correlation to the target), data REs are sorted by correlation to the target RE in a descending order of channel correlation. The first N data REs are selected, where N is a number of data REs that may be used for data-aided CE.

For selecting reliable data REs, data REs are selected that have a variance, computed from feedback LLR, less than a predefined threshold value, where a smaller variance implies more reliable feedback.

The detector or decoder feedback a posteriori LLRs are used to obtain a posteriori probabilities (APPs) of data. Given observation y and any channel estimate $\hat{h}$ used for detection, the a posteriori LLR for the n-th bit of data symbol x is defined as in Equation (57) as follows:

$$L_n(x) = \log\frac{P(b_n(x) = 1 \mid \hat{h}, y)}{P(b_n(x) = 0 \mid \hat{h}, y)} = \log\frac{P(b_n(x) = 1 \mid \hat{h}, y)}{1 - P(b_n(x) = 1 \mid \hat{h}, y)}, \quad (57)$$

where $b_n(x)$ is the n-th bit value of symbol x.

The APP of the bit $b_n(x)$ may be represented by Equations (58) and (59) as follows:

$$P(b_n(x) = 1 \mid \hat{h}, y) = \frac{e^{L_n(x)/2}}{e^{L_n(x)/2} + e^{-L_n(x)/2}}, \quad (58)$$

$$P(b_n(x) = 0 \mid \hat{h}, y) = \frac{e^{-L_n(x)/2}}{e^{L_n(x)/2} + e^{-L_n(x)/2}},$$

where the APP of the symbol x is:

$$P(x = s \mid \hat{h}, y) = \quad (59)$$

$$\prod_{n=1}^{N} P(b_n(x) = b_n(s) \mid \hat{h}, y) = \prod_{n=1}^{N} \left( \frac{e^{(2b_n(s)-1)L_n(x)/2}}{e^{L_n(x)/2} + e^{-L_n(x)/2}} \right),$$

where N is the number of bits in a symbol.

Using the APP, the first and the second order moment of a symbol may be obtained from Equations (60) and (61) as follows:

$$\mathbb{E}[x|\hat{h},y] = \qquad (60)$$

$$\sum_{i=0}^{2^N-1} s_i P(x=s_i|\hat{h},y) = \sum_{i=0}^{2^N-1} s_i \prod_{n=1}^{N} P(b_n(x)=b_n(s)|\hat{h},y),$$

where $$\mathbb{E}[|x|^2|\hat{h},y] = \sum_{i=0}^{2^N-1} |s_i|^2 P(x=s_i|\hat{h},y) \qquad (61)$$

$$= \sum_{i=0}^{2^N-1} |s_i|^2 \prod_{n=1}^{N} P(b_n(x)=b_n(s)|\hat{h},y).$$

The variance of data symbol x is given by Equation (62) as follows:

$$\text{Var}(x|\hat{h},y) = \mathbb{E}[|x|^2|\hat{h},y] - (\mathbb{E}[x|\hat{h},y])^2. \qquad (62)$$

Figure 14:
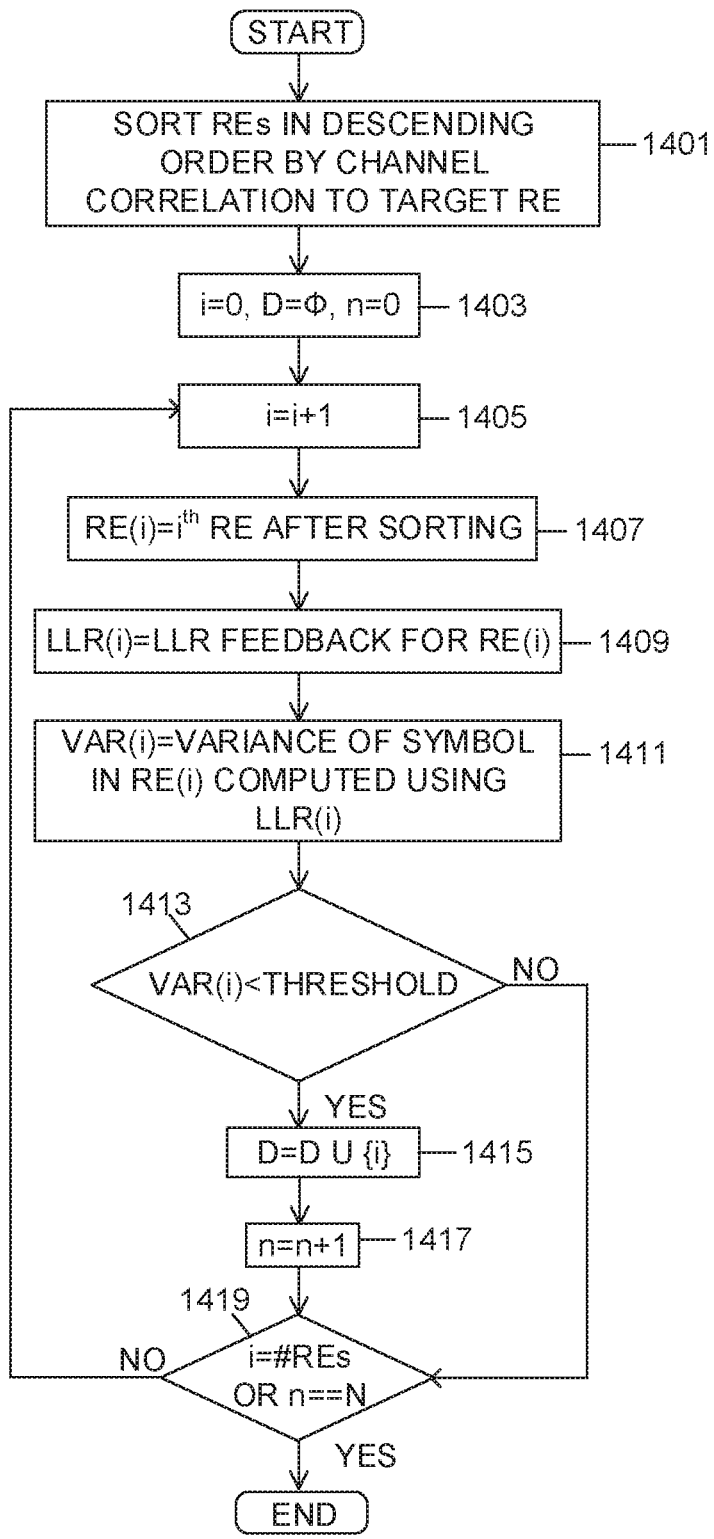
FIG. 14 is a flowchart of a method of data resource element (RE) selection by sorting and thresholding, according to an embodiment of the present disclosure.

FIG. 14 is a flowchart of a method of data resource element (RE) selection by sorting and thresholding, according to an embodiment of the present disclosure.

Referring to FIG. 14, the present system sorts REs in descending order of channel correlation to a target RE at 1401.

At 1403, the present system sets a first counter i to 0, a second counter D to Φ, and a third counter n to 0. Counter i represents the number of an RE, D represents a set of selected data REs, Φ indicates that D is initialized to the empty set, and n represents an iteration number.

At 1405, the present system increments i by 1.

At 1407, the present system determines the ith RE (e.g., RE(i)) from the list of REs, which are sorted in descending order, where RE(0) represents the RE with the greatest channel correlation among the REs in the list.

At 1409, the present system determines LLR(i) based on LLR feedback for RE(i).

At 1411, the present system computes a variance of symbol RE(i) (e.g., Var(i)) using LLR(i).

At 1413, the present system determines if VAR(i) is less than a predetermined threshold. If Var(i) is less than the predetermined threshold then the method of FIG. 14 proceeds to 1415. If Var(i) is greater than the predetermined threshold then the method of FIG. 14 proceeds to 1419.

At 1415, the present system sets D equal to D∪{i}.

At 1417, the present system increments n by 1.

At 1419, if i is not equal to the total number of REs and n is not equal to a predetermined number of total iterations N, then the method of FIG. 14 returns to 1405. If i is equal to the total number of REs or n is equal to N, then the method of FIG. 14 terminates.

In an embodiment of the present disclosure, for fixed data RE selection, an RB may be divided into a finite number of sub-blocks and fixed data REs may be used for data-aided CE in each sub-block. The number of sub-blocks and the method of dividing an RB into several sub-blocks may be determined based on the application.

For example, fixed data RE selection may be for 2 sub-blocks. For CE in a first sub-block (e.g., sub-block 1), 6 data REs may be used as additional pilot signals, and for CE in a second sub-block (e.g., sub-block 2), 6 data REs may be used as additional pilot signals.

2D CE utilizes observations distributed across both subcarriers and OFDM symbols. Data-aided iterative CE may be applied in addition to pilot-aided 2D MMSE CE. The data REs used for iterative CE may be selected by dynamic data RE selection based on sorting and thresholding or by fixed data RE selection based on dividing an RB into sub-blocks and using fixed data RE location for each sub-block.

Frequency-domain CE may be provided by performing 1D MMSE two times using frequency and time correlation separately. This approach includes two steps (e.g., FD MMSE, and TD interpolation). Data-aided iterative CE may be applied in addition to the 2×1D CE framework. In this case, the data-aided iterative CE is employed for refining FD CE while the TD interpolation remains the same.

Figure 15:
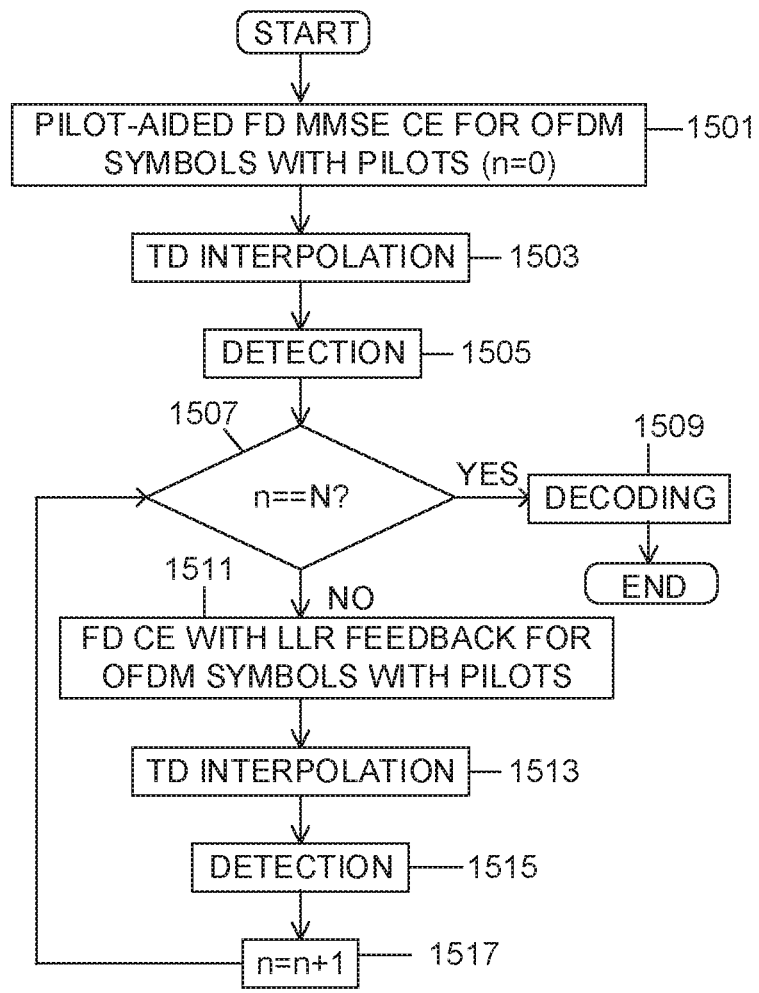
FIG. 15 is a flowchart of iterative 2×1D CE using feedback from a detector, according to an embodiment of the present disclosure.

FIG. 15 is a flowchart of iterative 2×1D CE using feedback from a detector, according to an embodiment of the present disclosure.

Referring to FIG. 15, the present system performs a pilot-aided FD MMSE CE for OFDM symbols with pilot signals and sets a counter n to 0 at 1501.

At 1503, the present system performs TD interpolation of the pilot-aided FD MMSE CE for OFDM symbols with pilot signals.

At 1505, the present system performs detection of the pilot-aided FD MMSE CE for OFDM symbols with pilot signal.

At 1507, the present system determines or if n is equal to a pre-determined number of iterations N. If n is equal to N, the method of FIG. 15 proceeds to 1509. If n is not equal to N, the method of FIG. 15 proceeds to 1511.

At 1509, the present system performs decoding, and the method of FIG. 15 is terminated.

At 1511, the present system performs data-aided FD CE for OFDM symbols with pilot signals.

At 1513, the present system performs TD interpolation.

At 1515, the present system performs detection.

At 1517, n is incremented by 1 and the method of FIG. 15 returns to 1507.

Figure 16:
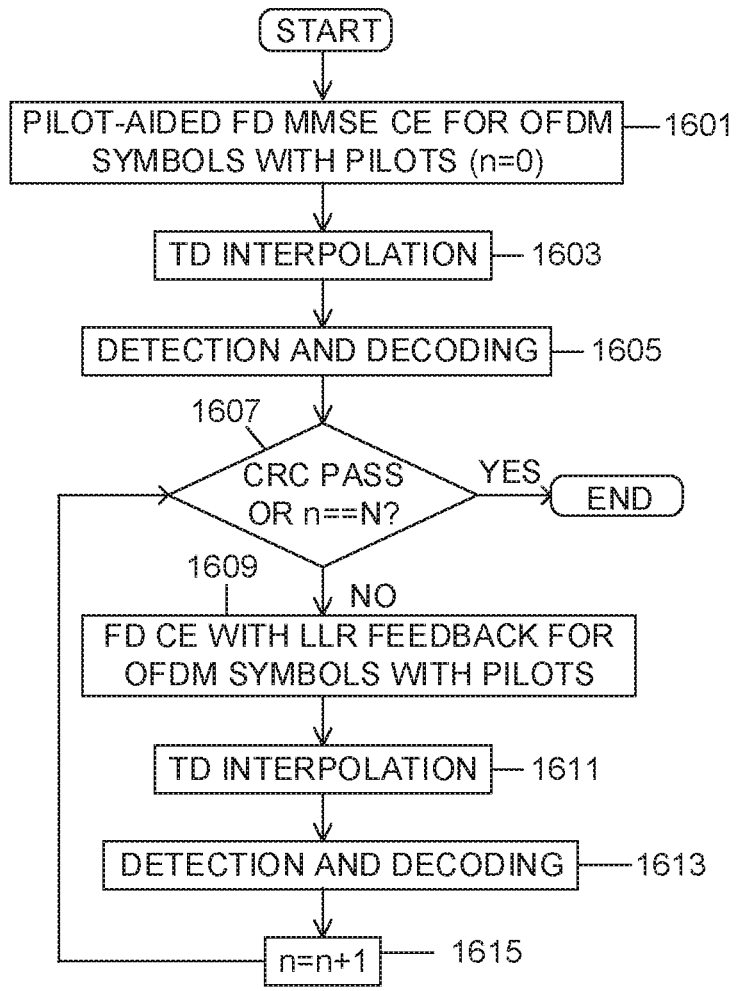
FIG. 16 is a flowchart of iterative 2×1D CE using feedback from a decoder, according to an embodiment of the present disclosure.

FIG. 16 is a flowchart of iterative 2×1D CE using feedback from a decoder, according to an embodiment of the present disclosure.

Referring to FIG. 16, the present system performs a pilot-aided FD MMSE CE for OFDM symbols with pilot signals and sets a counter n to 0 at 1601.

At 1603, the present system performs TD interpolation of the pilot-aided FD MMSE CE for OFDM symbols with pilot signals.

At 1605, the present system performs detection and decoding of the pilot-aided FD MMSE CE for OFDM symbols with pilot signal.

At 1607, the present system determines if CRC passes or if n is equal to a pre-determined number of iterations N. If CRC passes or n is equal to N, the method of FIG. 16 terminates. If CRC does not pass and n is not equal to N, the method of FIG. 16 proceeds to 1609.

At 1609, the present system performs data-aided FD CE for OFDM symbols with pilot signals.

At 1611, the present system performs TD interpolation.

At 1613, the present system performs detection and decoding.

At 1615, n is incremented by 1 and the method of FIG. 16 returns to 1607.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
    (a) determining a channel estimate using a pilot signal, wherein a counter n is initialized to n=0, where n is an integer;
    (b) determining a log likelihood ratio (LLR) of data symbols by a detector based on the channel estimate for one or more layers L, wherein L is an integer indicating a total number of layers;
    (c) performing decoding of the LLR of the data symbols if n is equal to a predetermined number of iterations N, otherwise proceeding to step (d), where N is an integer;
    (d) determining the channel estimate using the LLR of the data symbols from step (c) and data resource element (RE) observations;
    (e) determining the LLR of the data symbols by the detector based on the channel estimate from step (d);
    (f) incrementing n by 1 and returning to step (c);
    (g) estimating channels for the L layers using pilot signals, wherein the counter n is initialized to n=0, and wherein L is greater than or equal to 1;
    (h) performing detection for the L layers;
    (i) performing decoding if n is equal to the predetermined number of iterations N, otherwise setting l equal to 1, wherein l is an integer indicating a current layer;
    (j) performing data-aided channel estimation (CE) for the L layers;
    (k) performing detection of the current layer l;
    (l) incrementing l by 1; and
    (m) if l is greater than or equal to L then incrementing n by 1 and returning to step (i), otherwise, returning to step (j).

2. The method of claim 1, wherein estimating the channels for the L layers using the pilot signals is comprised of performing pilot-aided frequency domain (FD) minimum mean square error (MMSE) CE for orthogonal frequency-division multiplexing (OFDM) with the pilot signals and time division (TD) interpolation,
    wherein if n is equal to the predetermined number of iterations N then performing decoding and terminating the method, otherwise setting l equal to 1 is comprised of if a cyclic redundancy check (CRC) passes or if n is equal to the predetermined number of iterations N then performing decoding and terminating the method, otherwise setting l equal to 1, and
    wherein performing the data-aided CE for the L layers is comprised of performing data-aided FD CE for OFDM symbols with the pilot signals and the TD interpolation.

3. A method, comprising:
    (a) determining a channel estimate using a pilot signal, wherein a counter n is initialized to n=0, where n is an integer;
    (b) determining a log likelihood ratio (LLR) of data symbols by a detector based on the channel estimate for one or more layers L, wherein L is an integer indicating a total number of layers;
    (c) performing decoding of the LLR of the data symbols if n is equal to a predetermined number of iterations N, otherwise proceeding to step (d), where N is an integer;
    (d) determining the channel estimate using the LLR of the data symbols from step (c) and data resource element (RE) observations;
    (e) determining the LLR of the data symbols by the detector based on the channel estimate from step (d);
    (f) incrementing n by 1 and returning to step (c);
    (g) sorting resource elements (REs) in descending order by channel correlation to a target RE;
    (h) setting a counter i equal to i=0 and a count D to an empty set Φ, wherein i is an integer and represents a number of RE, D represents a set of selected data REs, Φ indicates that D is initialized to the empty set Φ, and the counter n equals to n=0;
    (i) incrementing i by 1;
    (j) setting RE(i) to an ith RE after sorting;
    (k) setting an ith log-likelihood ratio (LLR(i)) to an LLR feedback for the RE(i);
    (l) setting an ith variance (VAR(i)) to a variance of a symbol in the RE(i) computed using the LLR(i);
    (m) determining if the VAR(i) is less than a pre-determined threshold;
    (n) if the VAR(i) is greater than or equal to the pre-determined threshold then proceeding to step (p);
    (o) if the VAR(i) is less than the pre-determined threshold then setting D to the union of D and i, incrementing n by 1, and proceeding to step (p); and
    (p) if i is equal to the number of REs or n is equal to N then terminating the method, otherwise, returning to step (i).

4. A method, comprising:
    (a) determining a channel estimate using a pilot signal, wherein a counter n is initialized to n=0, where n is an integer;
    (b) determining a log likelihood ratio (LLR) of data symbols by a detector based on the channel estimate for one or more layers L, wherein L is an integer indicating a total number of layers;
    (c) performing decoding of the LLR of the data symbols if n is equal to a predetermined number of iterations N, otherwise proceeding to step (d), where N is an integer;
    (d) determining the channel estimate using the LLR of the data symbols from step (c) and data resource element (RE) observations;
    (e) determining the LLR of the data symbols by the detector based on the channel estimate from step (d);
    (f) incrementing n by 1 and returning to step (c);
    (g) performing pilot-aided frequency division (FD) minimum mean square error (MMSE) channel estimation (CE) for orthogonal frequency division multiplexing (OFDM) symbols with pilot signals, wherein the counter n is initialized to n=0;
    (h) performing time division (TD) interpolation on the result of step (g);
    (i) performing detection on the result of step (h);
    (j) if n is equal to the predetermined number of iterations N then performing decoding and terminating the method, otherwise proceeding to step (k);
    (k) performing data-aided FD CE for OFDM symbols with the pilot signals;
    (l) performing TD interpolation on the data-aided FD CE for OFDM symbols with the pilot signals of step (k);
    (m) performing detection on the result of step (l); and
    (n) incrementing n by 1 and returning to step (j).

5. A method, comprising:
    (a) determining a channel estimate using a pilot signal, where a counter n is initialized to n=0, wherein n is an integer;
    (b) determining a first log likelihood ratio (LLR) of data symbols by a detector based on the channel estimate for one or more layers L, where L is an integer indicating a total number of layers;
    (c) determining a second LLR of the data symbols by a decoder based on the first LLR;

(d) determining the channel estimate using the second LLR of the data symbols from step (c) and data resource (RE) observations;
(e) determining the first LLR by the detector based on the channel estimate from step (d);
(f) determining the second LLR by the decoder based on the first LLR from step (e);
(g) incrementing n by 1;
(h) returning to step (d) based on one of not passing a cyclic redundancy check (CRC) and n is less than a predetermined number of iterations N;
(i) estimating channels for the L layers using pilot signals, wherein the counter n is initialized to n=0, and wherein L is greater than or equal to 1;
(j) performing detection and decoding for the L layers;
(k) terminating if the CRC passes for the L layers or n is equal to the predetermined number of iterations N, otherwise setting l equal to 1, wherein l is an integer indicating a current layer;
(l) performing data-aided channel estimation (CE) for the L layers;
(m) performing detection and decoding of the current layer l;
(n) incrementing l by 1; and
(o) if l is greater than or equal to L then incrementing n by 1 and returning to step (k), otherwise, returning to step (l).

6. The method of claim 5, wherein estimating channels for the L layers using pilot signals is comprised of performing pilot-aided frequency domain (FD) minimum mean square error (MMSE) CE for orthogonal frequency-division multiplexing (OFDM) with the pilot signals and time division (TD) interpolation, and
wherein performing the data-aided CE for the L layers is comprised of performing data-aided FD CE for OFDM symbols with the pilot signals and the TD interpolation.

7. An apparatus, comprising:
a pilot-aided minimum mean square error (MMSE) channel estimation (CE) circuit, including an input for receiving pilot resource element (RE) observations, a first output, and a second output;
a detector, including a first input connected to the first output of the pilot-aided MMSE CE circuit, a second input for receiving data-aided iterative CE, a third input for receiving iterative detection and decoding (IDD), a first output, and a second output;
a decoder, including an input connected to the first output of the detector, a first output connected to the third input of the detector, and a second output;
a data-aided iterative CE circuit, including a first input, a second input connected to the second output of the pilot-aided MMSE CE circuit, a third input, and an output connected to the second input of the detector; and
a symbol regenerator circuit, including an input connected to the second output of the detector, and an output connected to the third input of the data-aided iterative CE circuit.

8. An apparatus, comprising:
a pilot-aided minimum mean square error (MMSE) channel estimation (CE) circuit, including an input for receiving pilot resource element (RE) observations, a first output, and a second output;
a detector, including a first input connected to the first output of the pilot-aided MMSE CE circuit, a second input for receiving data-aided iterative CE, a third input for receiving iterative detection and decoding (IDD), and an output;
a decoder, including an input connected to the output of the detector, a first output connected to the third input of the detector, and a second output;
a data-aided iterative CE circuit, including a first input, a second input connected to the second output of the pilot-aided MMSE CE circuit, a third input, and an output connected to the second input of the detector; and
a symbol regenerator circuit, including an input connected to the second output of the decoder, and an output connected to the third input of the data-aided iterative CE circuit.

9. A method, comprising:
(a) performing pilot-aided frequency division (FD) minimum mean square error (MMSE) channel estimation (CE) for orthogonal frequency division multiplexing (OFDM) symbols with pilot signals, wherein a counter n is initialized to n=0, wherein n is an integer;
(b) performing time division (TD) interpolation on the result of step (a);
(c) performing detection and decoding on the result of step (b);
(d) if a cyclic redundancy check (CRC) passes or if n is equal to a predetermined number of iterations N, where N is an integer, then terminating the method, otherwise proceeding to step (e);
(e) performing data-aided FD CE for OFDM symbols with the pilot signals;
(f) performing TD interpolation on the result of step (e);
(g) performing detection and decoding on the result of step (f); and
(h) incrementing n by 1 and returning to step (d).

* * * * *